United States Patent [19]

Ekern et al.

[11] Patent Number: 5,759,283
[45] Date of Patent: Jun. 2, 1998

[54] METHOD FOR PROCESSING SUGAR BEETS TO PRODUCE A PURIFIED BEET JUICE PRODUCT

[75] Inventors: Eric P. Ekern; Bimal Goculdas, both of Greeley, Colo.; Michael Donovan, Essex; Marc Hlavacek, London, both of Great Britain

[73] Assignee: The Western Sugar Company, Denver, Colo.

[21] Appl. No.: 645,702

[22] Filed: May 14, 1996

[51] Int. Cl.⁶ .............. C13D 1/08; C13D 1/14; C13D 3/12; C13D 3/16

[52] U.S. Cl. .............. 127/42; 127/44; 127/48; 127/50; 127/55; 127/57; 127/46.1; 210/639; 210/650; 210/705

[58] Field of Search .............. 127/42, 48, 50, 127/55, 57, 46.1, 44; 210/639, 650, 705

[56] References Cited

U.S. PATENT DOCUMENTS

| | | | |
|---|---|---|---|
| 1,578,463 | 3/1926 | Nicholson et al. | |
| 1,815,276 | 7/1931 | Schwieger | |
| 2,164,186 | 6/1939 | Brown et al. | 127/50 |
| 2,547,298 | 4/1951 | Wiklund | 127/50 |
| 2,557,800 | 6/1951 | Seailles | 127/52 |
| 2,697,049 | 12/1954 | Brieghel-Müller | 127/50 |
| 2,774,693 | 12/1956 | Brieghel-Müller | 127/50 |
| 2,801,940 | 8/1957 | Stark et al. | 127/44 |
| 2,824,028 | 2/1958 | Zenzes | 127/50 |
| 2,977,253 | 3/1961 | Grandadam | 127/50 |
| 3,089,789 | 5/1963 | Van Note | 127/50 |
| 3,113,044 | 12/1963 | Alston | 127/48 |
| 3,168,419 | 2/1965 | Galé | 127/50 |
| 3,212,857 | 10/1965 | Heinrich | 23/270 |
| 3,734,773 | 5/1973 | Haley | 127/48 |
| 4,328,043 | 5/1982 | Freytag et al. | 127/44 |
| 4,432,806 | 2/1984 | Madsen et al. | 127/48 |
| 4,716,044 | 12/1987 | Thomas et al. | 426/51 |
| 4,795,494 | 1/1989 | Toth et al. | 127/48 |
| 5,320,681 | 6/1994 | Moc et al. | 127/46.1 |
| 5,480,490 | 1/1996 | Toth et al. | 127/42 |
| 5,554,227 | 9/1996 | Kwok et al. | 127/58 |

FOREIGN PATENT DOCUMENTS

| | | | |
|---|---|---|---|
| 635578-A1 | 1/1995 | European Pat. Off. | C13F 1/14 |
| 655507-A2 | 5/1995 | European Pat. Off. | C13D 1/00 |
| 2586360 | 2/1987 | France | B01D 25/12 |
| 136455 | 7/1979 | Germany | B01D 21/06 |
| 3229345 | 2/1984 | Germany | A23C 9/13 |
| 5004929 | 1/1993 | Japan | A61K 35/84 |
| 6287199 | 10/1994 | Japan | B01F 17/56 |
| 8800175 | 8/1989 | Netherlands | C12G 1/00 |
| 2016637 | 7/1994 | Russian Federation | B01D 61/44 |
| 1669984 | 8/1991 | U.S.S.R. | C13D 1/00 |
| 9208810 | 5/1992 | WIPO | B01D 61/24 |

OTHER PUBLICATIONS

Guralj, et al., *Technolgija Secera*, 1965, p. 510 Month not available (translated illustration of lime production factory).

Clarke, S., "Purification Using Membrane Filtration", *Sugar Journal*, Nov., 1994 (p. 5).

Freeman, L., "Membrane Filtration", *Food Engineering*, Nov., 1987, (pp. 107 and 109–110).

Lancrenon, X., et al., "Mineral Membranes for the Sugar Industry", *Sugar y Azucar*, May 1993 (pp. 40–43 and 45).

Hanssens, T.R., et al., "Ultrafiltration as an Alternative for Raw Juice Purification in the Beet Sugar Industry", paper presented at the 17th General Assembly of C.I.T.S., Copenhagen, Denmark (1983), *Zucker Industry Journal* 109: 152–156 (1984).

Product Information Sheet 000DOC20 re Tech–Sep Co. Filtration Systems (Jul. 1994).

Product Information Sheet involving filtration systems produced by Osmo Membrane Systems (P/N 18574, 1985) Month not available.

Information Sheet on membrane filtration by Koch Membrane Systems, Inc. entitled "Spiral–Wound Module" (not dated) Month not available.

McGinnis, R.A. (ed.), *Beet–Sugar Technology*, Beet Sugar Development Foundation, Fort Collins, CO (USA), 3rd ed., Ch XVII, pp. 567–593 (1982) Month not available.

Kishihara S., et al., "Improvement of Flux in Ultrafiltration of Cane Juice", *Int. Sugar Jnl.*, vol. 85 (1012):99–102 (1983) Month not available.

Nielsen, W.K., et al. "Prospects and Possibilities in Application of Membrane Filtration Systems Within the Beet and Cane Sugar Industry", *Sugar Technology Reviews*, 9:59–117 (1982) Month not available.

*Primary Examiner*—Glenn Caldarola
*Assistant Examiner*—Patricia L. Hailey
*Attorney, Agent, or Firm*—Jay K. Malkin; Klaas, Law, O'Meara & Malkin, P.C.

[57] ABSTRACT

An efficient method for manufacturing a purified juice product from sugar beets. Untreated beet juice is initially prelimed using lime and $CaCO_3$ to produce a prelimed juice product. Instead of subjecting the prelimed product to main liming and dual carbonation stages, the product is delivered to a porous filtration membrane which allows sugar molecules to pass therethrough which preventing the passage of solid matter and dissolved impurities. Optimum results are achieved if the prelimed product flows across the membrane from end to end. The membrane permeate is thereafter combined with $CO_{2(g)}$ in a single carbonation stage to remove dissolved lime. This step generates a purified juice product which can be processed to manufacture pure crystalline sugar. The membrane retentate can be combined with water and refiltered to collect residual sugar materials. The foregoing process uses less energy and raw materials (e.g. lime) compared with conventional methods.

16 Claims, 4 Drawing Sheets

METHOD FOR PROCESSING SUGAR BEETS TO PRODUCE A PURIFIED BEET JUICE PRODUCT

BACKGROUND OF THE INVENTION

The present invention generally relates to the manufacture of beet sugar, and more particularly to the efficient production of a purified sugar-containing juice product from raw beets which uses a substantially reduced number of process steps, equipment and reactants compared with prior methods.

A considerable amount of sugar is produced throughout the world from sugar beets. To obtain a completed, purified sugar product from sugar beet materials, raw beets are treated to remove sugar-containing juices therefrom. The juices are thereafter subjected to numerous isolation and purification steps so that a final crystalline sugar product can be obtained. In a typical treatment process, sugar beet juice is obtained by physically slicing raw beets into strips or "cossettes" which are placed in contact with heated water. As a result, sugar-containing beet juice is extracted from the beets to generate a raw juice product. This material normally contains a moderate amount of solid particulate matter therein (primarily derived from cellulosic materials within the raw beets). In most cases, the raw juice product will contain about 0.2–0.5% by weight solid, undissolved materials, and about 13–16% by weight water-soluble compositions (including dissolved sugar molecules).

The raw juice is thereafter treated using one or more mechanical screening processes to remove most of the solid matter therefrom. The resulting strained juice product is commonly known as "diffusion juice". This material (which is ultimately subjected to additional treatment steps) typically includes water, dissolved sugar (sucrose), dissolved non-sugar impurities, and colloidal (suspended) non-sugar impurities. The non-sugar impurities are often highly colorized and/or thermally unstable. In this regard, they can interfere with subsequent treatment steps and adversely impact the quality and quantity of the final sugar product. It is therefore necessary to remove as many non-sugar impurities from the diffusion juice as possible. At this stage in the process, the diffusion juice typically contains about 82–85% by weight water, about 13–15% by weight dissolved sugar, and about 2–3% by weight dissolved/colloidal non-sugar impurities. The overall weight of the diffusion juice is about 105–130% of the weight of the raw beet materials being processed.

Conventional beet juice purification processes initially involve a step known as "preliming" in which the pH of the incoming juice materials is raised from an initial (starting) level of about 6.3–6.5 to a level above about 11.6 (e.g. optimally between about 11.5–11.8). Preliming of the diffusion juice provides many functional benefits, including improved flocculation of impurities (discussed below), as well as enhanced pH stabilization, decolorization, and filterability. In particular, preliming enables substantial amounts of undesirable materials to be precipitated from the juice. These materials include but are not limited to inorganic acids, organic acids, phosphates, metal ions (e.g. iron, aluminum, and/or magnesium ions), proteins, pectins, coloring agents, and saponins.

The addition of lime materials to accomplish preliming is typically undertaken in a preliming vessel. While many different vessels can be used for this purpose, a preferred system is disclosed in U.S. Pat. No. 2,774,693 to Brieghel-Müller which is incorporated herein by reference and further discussed below. The particular system disclosed in the foregoing patent involves a tank having a plurality of chambers and multiple mixing blades therein. Within the tank, lime (and calcium carbonate materials) are added to the incoming diffusion juice in a controlled, gradual, and progressive manner, with the particular details of this process being discussed in U.S. Pat. No. 2,774,693 cited above. The terms "lime", "lime materials", "milk of lime", and "lime compositions" as used herein shall be considered equivalent, and will specifically involve calcium oxides or calcium hydroxides in solid or liquid (suspension) form. Milk of lime is preferred in most diffusion juice purification processes, and consists of a suspension of calcium hydroxide ($Ca(OH)_2$) which is formed in accordance with the following reaction:

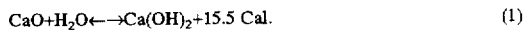

$$CaO + H_2O \leftarrow\!\!\rightarrow Ca(OH)_2 + 15.5 \text{ Cal.} \quad (1)$$

Within the preliming tank/containment vessel, a highly efficient treatment process occurs in which the pH of the diffusion juice materials is increased as noted above. This procedure causes non-sugar materials (especially proteins in both dissolved and colloidal form) to flocculate and produce a plurality of solid floc particles. Regarding non-sugar proteins, gradual pH increases which result from the preliming process enable these materials to reach their respective iso-electric points. The term "iso-electric point" as used herein shall involve a pH level at which protein colloidal particles within the diffusion juice materials have a zero electrical potential. When the foregoing materials reach their designated iso-electric points, they flocculate to form a plurality of solid floc particles as indicated above. Flocculation is further enhanced by the addition of calcium carbonate materials to the preliming tank which functionally form a core or substrate which is surrounded (encapsulated) by the flocculated protein materials. This process increases the weight and density of the floc particles, thereby facilitating the filtration/settling of such materials and their removal from the system.

In conventional processing methods, the resulting prelimed juice product which consists of a mixture containing diffusion juice, residual lime, excess calcium carbonate, and floc particles is subjected to a plurality of subsequent steps which are performed in a sequential manner. Specifically, the mixture is first subjected to a main liming stage in which large amounts of lime (milk of lime) are added. This step causes the pH of the limed product to increase to a level above about 12.6. As a result, dissolved/colloidal non-sugar materials which were not affected during preliming of the diffusion juice are decomposed in order to produce a treated juice product. In particular, main liming of the juice materials as described above achieves juice thermostability by partial decomposition of invert sugar amino acids, amides, and other dissolved (non-sugar) materials. If not eliminated, these materials can cause serious problems in subsequent processing steps when the juice product is exposed to high temperature and pressure levels. It is important to note at this point that main liming uses a significant amount of raw materials (e.g. lime) and energy. In conventional sugar processing, about 90% of the total lime used in the entire process will be consumed during the main liming stage as noted above. As discussed below, elimination and/or modification of the main liming stage will result in a substantial reduction in production costs and a significant increase in system efficiency.

After main liming, the treated juice product is subjected to a first carbonation stage in which carbon dioxide gas is combined with the product. The first carbonation stage is designed to adjust the pH of the juice product to a desired level (e.g. about 11.0–11.6 in a preferred embodiment). As a result, the carbon dioxide gas reacts with residual lime in the treated juice product to produce a substantial amount of calcium carbonate in the form of a fine precipitate. Not only is residual lime removed using this procedure, but the surface-active calcium carbonate precipitate is able to adsorb substantial amounts of remaining dissolved non-sugar contaminants. Furthermore, the calcium carbonate precipitate functions as a filter aid in the physical removal of solid materials from the treated juice product (e.g. the removal of floc particles). In this regard, the juice product is efficiently filtered and further purified.

The treated juice product is then subjected in most cases to a settling step, additional heating and a second carbonation stage. The second carbonation stage is designed to further adjust the pH of the juice product to a desired level (e.g. about 8.8–9.4 in a preferred embodiment). As a result, the remaining excess lime in solution is precipitated therefrom. The treated juice product is then conventionally filtered using a standard mechanical filtration system (e.g. a screen-type mechanical drum filter unit or standard pressure leaf system) to remove any residual solid materials and particulates so that a purified juice product is obtained. The purified juice product may thereafter be combined (if desired) with a supply of $SO_{2(g)}$. The $SO_{2(g)}$ is designed to inhibit oxidation reactions which increase color formation in the product. At this stage, the purified juice product (which is conventionally known as "thin juice") is ready for evaporative thickening and sugar crystallization. Further information regarding this process and related procedures used to treat/purify sugar beet juice materials is provided in U.S. Pat. Nos. 1,578,463 to Nicholson et al.; 1,815,276 to Schweiger; 2,164,186 to Brown et al.; 2,547,298 to Wiklund; 2,557,800 to Seailles; 2,697,049 to Brieghel-Müller; 2,774,693 to Brieghel-Müller; 2,824,028 to Zenzes; 2,977,253 to Grandadam; 3,089,789 to Van Note; 3,113,044 to Alston; 3,168,419 to Gale; 3,734,773 to Haley; and 5,320,681 to Moc et al. which are all incorporated herein by reference.

In summary, conventional sugar beet processing to obtain the thin juice (which is likewise designated as a "purified juice product") involves the following main steps in sequential order:

(1) Slicing of raw beets to produce "cossettes";
(2) Placement of the cossettes in water to extract sugar-containing juices so that a "raw juice product" may be produced;
(3) Straining the raw juice product to remove solids in order to generate "diffusion juice";
(4) Preliming the diffusion juice with lime (e.g. milk of lime) and calcium carbonate so that a "prelimed juice product" is prepared;
(5) Subjecting the prelimed juice product to main liming in which substantial amounts of lime (e.g. milk of lime) are used to generate a "treated juice product";
(6) Carbonating the treated juice product in a first carbonation stage with $CO_{2(g)}$;
(7) Allowing the treated juice product to settle (in most cases); and
(8) Carbonating the treated juice product in a second carbonation stage with $CO_{2(g)}$ to create a purified juice product which (after additional filtering and $SO_{2(g)}$ treatment if needed) is ready for evaporative thickening and final sugar crystallization.

Notwithstanding the ability of the foregoing process to manufacture a final sugar product from raw beets, it nonetheless consumes considerable quantities of energy and raw materials. Specifically, the main liming stage uses substantial amounts of lime. Lime is initially produced using a high-temperature calcining process which takes place in a lime kiln. To produce lime within the kiln, limestone (e.g. calcium carbonate) is heated to a temperature of about 980°–1200° C. for a time period of about 30–120 minutes. In this regard, the calcination process is energy intensive. A need therefore remains for an efficient beet sugar processing system which requires minimal amounts of energy and reactants (e.g. lime and/or $CO_{(2)}$), as well as a reduced number of production steps, labor, and equipment. The present invention satisfies this need, and represents a significant advance in sugar processing technology which provides many benefits, including a reduction in the levels of energy and raw materials that are needed to manufacture a purified juice product. Specifically, the claimed process enables steps (5)–(7) listed above to be eliminated, including the main liming stage and one of the two carbonation steps (e.g. the first carbonation stage). As a result, the required quantities of lime, $CO_{2(g)}$, and energy needed to produce a purified juice product are substantially decreased by a significant amount, along with a considerable reduction in the number of processing steps. This goals are achieved using a highly efficient and simplified technique which represents an advance in sugar processing technology as discussed below.

SUMMARY OF THE INVENTION

It is an object of the present invention to provide a highly efficient method for obtaining a purified, sugar-containing juice product from sugar beets.

It is another object of the invention to provide a method for obtaining a purified juice product from sugar beets which involves a substantial reduction in the number of processing steps which are needed to generate the juice product compared with prior production methods.

It is another object of the invention to provide a method for obtaining a purified juice product from sugar beets which uses reduced levels of energy.

It is another object of the invention to provide a method for obtaining a purified juice product from sugar beets which is characterized by a considerable reduction in the amount of raw materials which are needed in the manufacturing process, including a decrease in the required amount of lime and $CO_{2(g)}$. It is a further object of the invention to provide a method for obtaining a purified juice product from sugar beets which substantially reduces the need for large scale on-site lime production (e.g. high-capacity lime kilns) compared with prior methods.

It is a still further object of the invention to provide a method for obtaining a purified juice product from sugar beets which produces a crystalline sugar product of desired purity at a reduced cost compared with conventional processing techniques.

It is a still further object of the invention to provide a method for obtaining a purified juice product from sugar beets which is characterized by a decrease in the amount of lime-containing waste products which are generated.

It is a still further object of the invention to provide a method for obtaining a purified juice product from sugar beets which involves reduced labor and plant-space requirements.

It is an even further object of the invention to provide a method for obtaining a purified juice product from sugar beets in which the above-listed goals are accomplishing using a unique processing method which is a clear departure from prior systems. Specifically, the claimed process eliminates the main liming and primary carbonation stages which use substantial amounts of raw materials and energy. These steps are replaced by a single filtration step using a specialized membrane-type microporous filtration medium. To achieve optimum results, membrane filtration is used after preliming so that the prelimed juice product is introduced directly into the filtration system without any intervening steps. Membrane filtration at this particular stage (e.g. after preliming) is an important and unique aspect of the present invention which enables the treated juice product to be generated with a minimal number of process steps. Membrane filtration of the prelimed juice product is clearly distinguishable from membrane filtration at other stages (e.g. filtration of the "raw juice product" before preliming). In particular, membrane filtration of the prelimed juice materials produces superior results and requires a reduced number of additional processing stages as discussed below.

After membrane filtration of the prelimed juice product, the filtered juice product is subjected to a single carbonation stage to generate a purified juice product. In this regard, a unique 3-step method is provided which involves (A) preliming of the diffusion juice to generate a prelimed juice product; (B) membrane filtration of the prelimed juice product to produce a filtered permeate; and (C) carbonation of the permeate to manufacture a purified beet juice product. The completed juice product is substantially equivalent in purity levels to juice materials which are manufactured using the prior method described above. However, in the claimed process, main liming and one of the two carbonation stages are entirely eliminated. In this regard, the present invention represents a significant advance in sugar processing technology.

The following discussion will involve a brief overview of the claimed invention and its benefits. More detailed information regarding the process (including specific operating parameters) will be provided below in the section entitled "Detailed Description of Preferred Embodiments". In accordance with the invention, an improved method is provided for manufacturing a purified beet juice product. This product is ultimately thickened and evaporated to generate purified, crystalline sugar (sucrose). As noted above, the claimed method is characterized by a reduction in the number of required processing steps and raw materials (especially lime and carbon dioxide) compared with conventional manufacturing techniques. To prepare a purified juice product using the claimed process, a supply of beet juice is initially provided which consists of water, sugar, and dissolved non-sugar impurities. The beet juice is then combined with a preliminary supply of lime and a preliminary supply of calcium carbonate in a preliming chamber to produce a prelimed juice product containing a plurality of solid floc particles therein. The floc particles are formed from the non-sugar impurities within the beet juice when both the preliminary supply of lime and preliminary supply of calcium carbonate are combined with the juice.

To facilitate further processing of prelimed juice product as discussed below, the product is heated to a preferred temperature of about 50°–95° C. However, it is important to emphasize that the present invention shall not be specifically limited to this numerical range or any of the other numerical parameters outlined below which represent preferred embodiments provided for example purposes. Specific production and operating parameters will be determined in accordance with preliminary pilot studies involving a number of factors including the desired capacity of the system and other considerations. In addition, while heating of the prelimed juice product prior to membrane filtration is not required, it is nonetheless preferred in order to facilitate membrane separation of the desired components and enable more precise control of the filtration process. Temperature control is important since membrane flux rates will generally be influenced by the thermal characteristics of the materials being filtered in accordance with standard and accepted filtration technology.

Next, at least one porous primary filtration membrane is provided which includes a plurality of pores therethrough. To accomplish the goals of the present invention, each of the pores through the filtration membrane will be of substantially equivalent size with a diameter sufficient to prevent passage of the solid floc particles through the membrane while allowing dissolved sugar molecules to pass therethrough. In this regard, the diameter of each pore should not exceed about 0.5 microns. A high level of filtration efficiency is achieved using a diameter range of about 0.002–0.5 microns, with optimal results being obtained when a range of about 0.01–0.2 microns is employed. The selection of a given diameter value within this range will depend on a variety of factors including the particular sugar materials being treated, the desired capacity of the system, and other factors as determined by preliminary investigations. The use of a porous filtration membrane at this stage (e.g. after preliming) represents a unique development which facilitates and simplifies the sugar manufacturing process. Specific membranes which may be used for this purpose are highly specialized and, in a preferred embodiment, will consist of either a microfiltration membrane or an ultrafiltration membrane, with these membrane types being defined and discussed below.

The prelimed juice product is then delivered to the selected filtration membrane. The flow rate at which the prelimed juice product is delivered to the filtration membrane will vary in view of many factors which depend on the desired output levels and overall size of the processing system. In this regard, the present invention shall not be limited to any particular rate at which the prelimed juice product is delivered to the selected membrane system and any specific membrane flux rates (defined below). In an exemplary embodiment which is suitable for most sugar production facilities, the prelimed juice product will be supplied (e.g. delivered) to the filtration membrane system at a flow rate of about 1000–10000 GPM (gallons per minute) after the juice product is heated so that it flows onto the selected membrane structure as discussed below. This step generates a permeate which passes through the membrane at an optimum membrane flux rate of about 50–250 GFD (gallons per $ft^2$ per day) and a retentate which does not pass through the filtration membrane. Again, while the above-listed values will provide efficient results in a typical commercial sugar production facility, the specific membrane flux rate for any given situation will vary in view of many factors including the type of membrane filtration system being employed and the size of the sugar processing plant.

The solid floc particles described above which were present in the initial prelimed juice product will, after filtration, be present in the retentate and absent from the permeate. In addition, other dissolved and non-dissolved contaminants within the prelimed juice product which would normally be removed by main liming are removed from the prelimed juice product using the highly selective membranes described above. As a result, these materials are also absent from the permeate.

The present invention shall not be restricted to any particular configuration in connection with the porous filtration membrane. Flat (planar) membrane units may be used, although coiled, tubular membrane systems are preferred as discussed below. In addition, one or more commercially-available membrane units may be used in series or parallel, depending on the desired size and output of the processing system. The present invention shall also not be limited to any particular manner in which the prelimed juice product is delivered onto the filtration membrane. For example, the prelimed juice product may be delivered in a downward direction by gravity onto the surface of the membrane. However, in a preferred embodiment, an elongate membrane of either flat or coiled configuration will be employed having a first end and a second end. The prelimed juice product will be delivered to the first end in accordance with the flow rate parameters described above so that it flows onto the filtration membrane and travels across the membrane surface from the first end to the second end at the same flow rate listed above regarding initial delivery of the juice product to the membrane. As a result, the retentate and permeate will be produced during movement of the juice product across the membrane. In this type of system (which is characterized herein as "crossflow" filtration), the retentate will leave the filtration membrane at the second end of the membrane. Movement of the prelimed juice product across the filtration membrane from the first end to the second end will prevent cloggage of the pores in the membrane and increase the operating efficiency of the entire system by reducing system down-time. This type of self-cleaning filtration method will be discussed in greater detail below.

The permeate (which contains the desired sugar molecules therein) is then combined with a supply of carbon dioxide gas in a carbonation chamber. This step is designed to eliminate any residual amounts of dissolved lime which may be present in the permeate from the preliming process. The carbon dioxide gas will be used in an amount sufficient to eliminate the dissolved lime from the permeate by conversion of the dissolved lime into a calcium carbonate precipitate. In a preferred embodiment, the carbon dioxide will be used in a quantity sufficient to cause the permeate to have a pH level of about 8.8–9.4. This pH level will eliminate the dissolved lime from the permeate by converting it into the calcium carbonate precipitate described above. By eliminating the dissolved lime from the permeate, a purified beet juice product is produced which is characterized by the absence of dissolved lime therein. Instead, the purified beet juice product will contain the calcium carbonate precipitate. Immediately thereafter or at later stages in the production process, the calcium carbonate precipitate may be removed from the purified beet juice product by conventional means (e.g. using a standard pressure leaf filtration apparatus or drum filter). The removed precipitate (which, in most cases, will involve a sludge-like composition) may be discarded or, in a preferred embodiment, transferred to the preliming chamber for use as the preliminary supply of calcium carbonate. Recycling of the calcium carbonate precipitate will be discussed in greater detail below.

The retentate from the initial filtration process may either be discarded or further processed in accordance with an alternative embodiment of the invention. The retentate will primarily contain solid floc particles removed from the prelimed juice product. However, the retentate may also include residual amounts of dissolved sugar molecules which did not pass through the filtration membrane for many reasons, including hydrostatic association of the sugar molecules with the floc particles. To collect and recover the residual sugar molecules, an alterative system is employed which involves dual filtration membranes (e.g. primary and secondary porous filtration membranes). The primary filtration membrane will be the same as the membrane described above in the first embodiment of the invention, and will have identical characteristics (e.g. a pore diameter not exceeding about 0.5 microns with a preferred range of about 0.002–0.5 microns and an optimum range of about 0.01–0.2 microns). Likewise, the primary filtration membrane will function in an identical manner to produce the retentate and the permeate, with the flow rates and flux rates used in the first embodiment being applicable to the present embodiment. After formation of the retentate using the primary filtration membrane, the retentate is combined with a supply of water to produce an aqueous retentate product. The aqueous retentate product will contain the solid floc particles from the prelimed juice product combined with residual amounts of dissolved sugar molecules which did not pass through the primary filtration membrane as described above.

Next, at least one porous secondary filtration membrane is provided which includes a plurality of pores therethrough. In a preferred embodiment, the secondary filtration membrane will have the same characteristics and configuration as the primary filtration membrane. Specifically, each of the pores through the secondary filtration membrane will have a diameter sufficient to prevent the passage of solid floc particles through the secondary Filtration membrane while allowing passage of the dissolved sugar molecules. To accomplish this goal, each of the pores through the secondary filtration membrane will be of substantially equivalent size, with a diameter not exceeding about 0.5 microns (preferably about 0.002–0.5 microns with an optimum range of about 0.01–0.2 microns). The present invention shall not be restricted to any particular membrane configuration in connection with the secondary filtration membrane. Flat (planar) membrane units may be used, although coiled, tubular membrane systems are preferred as discussed below. In addition, one or more commercially-available microfiltration or ultrafiltration membrane units may be used in series or parallel, depending on the desired size and output of the processing system.

The aqueous retentate product is then delivered to the secondary filtration membrane so that it flows onto the membrane. In a preferred embodiment, the aqueous retentate product will be delivered to the secondary filtration membrane at a flow rate of about 100–1000 GPM. This step generates a solid waste product which does not pass through the secondary filtration membrane and a filtrate which passes through the membrane at an optimum flux rate of about 50–100 GFD. The filtrate will be characterized by the absence of solid floc particles therein, but will include the residual amounts of dissolved sugar molecules originally present in the aqueous retentate product.

The filtrate is then combined with the previously-generated permeate from the primary filtration membrane to form a juice mixture which is processed in the same manner described above regarding the permeate in the first embodiment of the invention. Specifically, the juice mixture (which contains sugar molecules from the initial permeate and residual sugar molecules from the retentate) is combined with a supply of carbon dioxide gas in a carbonation chamber to eliminate any residual amounts of dissolved lime which may be present in the mixture from the preliming process. The carbon dioxide gas will be used in an amount sufficient to eliminate the dissolved lime from the juice mixture by conversion of the dissolved lime into a calcium carbonate precipitate. In a preferred embodiment, the carbon dioxide will be used in a quantity sufficient to cause the juice mixture to have a pH level of about 8.8–9.4. This pH level will eliminate the dissolved lime from the mixture by converting it into the calcium carbonate precipitate. By eliminating the dissolved lime from the juice mixture, a purified beet juice product is produced which is characterized by the absence of dissolved lime therein. As described above in the first embodiment of the invention, the purified beet juice product will instead contain the calcium carbonate precipitate. Immediately thereafter or at later stages in the production process, the calcium carbonate precipitate may be removed from the purified beet juice product by conventional means (e.g. using a standard pressure leaf filtration apparatus or drum filter). The removed precipitate (which, in most cases, will involve a sludge-like composition) may be discarded or, in a preferred embodiment, transferred to the preliming chamber for use as the preliminary supply of calcium carbonate.

The present invention represents a significant advance in beet sugar processing technology. As described below, it is characterized by the elimination of multiple steps which require substantial amounts of energy and raw materials. Specifically, the main liming stage and one of the carbon dioxide treatment steps which are normally used in sugar production are eliminated. The present invention instead uses a unique 3-stage processing method for converting the initial diffusion juice into the purified juice product. This method involves: (A) preliming of the diffusion juice to generate a prelimed juice product; (B) membrane filtration of the prelimed juice product to produce a filtered permeate; and (C) carbonation of the permeate to manufacture a purified beet juice product. As result, the following benefits are achieved compared with prior methods: (1) a substantial reduction in the amount of lime (e.g. milk of lime) which is needed in the process; (2) a considerable decrease in the amount of carbon dioxide which is necessary; (3) simplification of the processing system by the elimination of various components and sub-systems associated with main liming; (4) a significant reduction in system energy consumption (especially in the production of lime since main liming is eliminated as a process step); (5) reduced environmental impact and the diminished production of lime-based waste materials; (6) a decreased number of processing steps; (7) substantially diminished labor and plant-space requirements; and (8) a considerable increase in the economic efficiency of the entire sugar production system in accordance with items (1)–(7) listed above.

These and other objects, features, and advantages of the present invention shall be described below in the following Brief Description of the Drawings and Detailed Description of Preferred Embodiments.

DETAILED DESCRIPTION OF PREFERRED EMBODIMENTS

The present invention involves a unique and highly efficient method for the production of a purified beet juice product from sugar beets. The method is characterized by many benefits as previously indicated. To clearly illustrate the significant differences between the method of the present invention and the most widely-used prior method for sugar production, a comparative discussion of both methods will now be provided. It will become readily apparent from this discussion that the claimed method represents an advance in sugar manufacturing technology.

A. Conventional Sugar Processing

Figure 1:
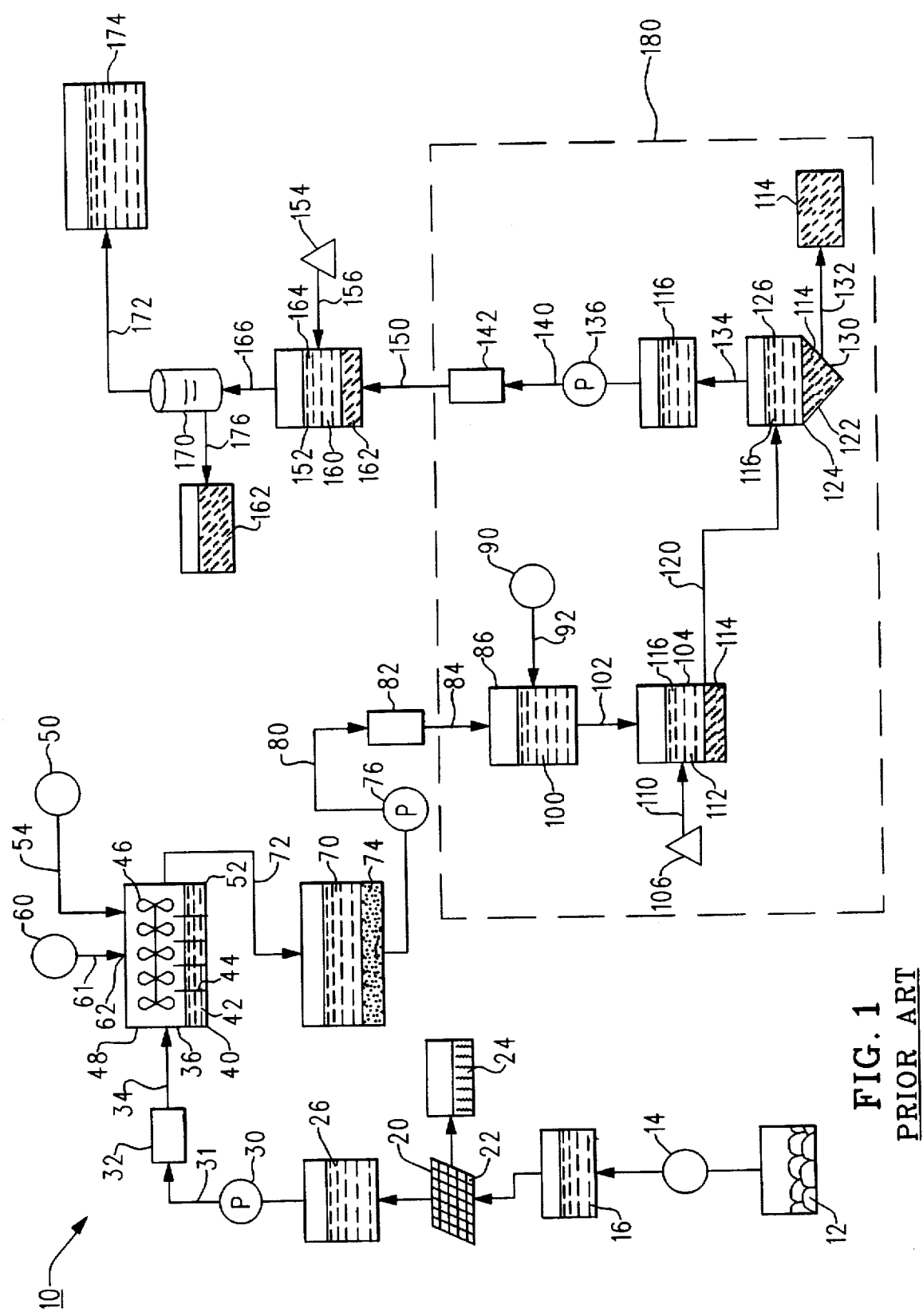
FIG. 1 is a schematic illustration of the process steps, procedures, and components which are used to prepare a purified beet juice product from sugar beets in accordance with a conventional production system.

With reference to FIG. 1, a conventional sugar processing system is disclosed and generally designated at reference number 10. As shown in FIG. 1, a supply of raw sugar beets 12 is provided which is passed through an extraction system 14 in order to produce a raw beet juice product 16. Specifically, the supply of raw sugar beets 12 is initially washed to remove dirt and other external contaminants, followed by placement of the washed beets 12 in the extraction system 14. Many different machines and components may be used in connection with the extraction system 14. In a preferred embodiment, the extraction system 14 will consist of a slicing unit which cuts each individual sugar beet into a plurality of thin strips conventionally known as "cossettes". The cossettes are then placed in contact with a counter-current flow of heated water (e.g. at a temperature of about 65°–85° C.) in order to cause the diffusion of sugar-containing materials from the cossettes into the water. As a result, the raw beet juice product 16 is produced which normally includes a considerable amount of beet tissue particles and about 13–16% by weight water soluble materials (including sugar [sucrose] compositions).

The raw beet juice product 16 is thereafter passed through a physical separation apparatus 20 to remove beet juice particles and other suspended solid materials therefrom. In a preferred embodiment, the physical separation apparatus 20 will consist of at least one vibrating or stationary screen unit 22 having an optimum mesh size of about 18–20 U.S. standard mesh. The retained solid materials 24 (again consisting primarily of beet particles and other extraneous particulate matter) are either discarded or processed in a conventional manner for use as livestock feed. The liquid which passes through the separation apparatus 20 will consist of filtered beet juice which is otherwise known as "diffusion juice" 26 (FIG. 1). The diffusion juice 26 normally contains water, sugar (e.g. sucrose), dissolved non-sugar impurities, and colloidal non-sugar impurities. In particular, the diffusion juice 26 typically comprises about 82–85% by weight water, about 13–15% by weight dissolved sugar (sucrose), and about 2–3% by weight various dissolved/colloidal non-sugar impurities. The overall weight of the diffusion juice 26 is normally about 105–130% of the weight of the raw sugar beets 12 being processed. Exemplary dissolved non-sugar impurities will include but not be limited to inorganic and organic acids, phosphate compositions, metal ions (e.g. iron, aluminum, and/or magnesium ions), proteins, pectins, coloring agents, and saponins. Likewise, exemplary colloidal non-sugar impurities will include but not be limited to amino acids, amides, glutamine, asparagine, and similar compositions. In most cases, the non-sugar impurities which are present within the diffusion juice 26 are highly colorized and thermally unstable. As a result, they can significantly interfere with sugar production from both a qualitative and quantitative standpoint. For this reason, it is necessary to remove as much of the non-sugar impurities as possible so that a highly purified crystalline sugar product can be produced.

With continued reference to FIG. 1, the diffusion juice 26 is initially passed via pump 30 (e.g. of a conventional volumetric or centrifugal type) and conduit 31 into a first heating unit 32. Many different types of commercially-available heating systems may be used in connection with the heating unit 32. In a preferred embodiment, the heating unit 32 will consist of a conventional multiple pass tube heating system or a plate heater apparatus known in the art for heating fluid materials. In this regard, the heating unit is optimally in-line and in fluid communication with the conduit 31 as illustrated. To achieve optimum results, it is preferred that the diffusion juice 26 be heated within the heating unit 32 to a temperature of about 65°–85° C. Heating at this temperature is designed to increase the reaction speed within subsequent (e.g. preliming) stages of the system 10, and to likewise deactivate enzyme materials present within the diffusion juice 26. It should also be noted that the pH of the diffusion juice 26 at this point in the system 10 is about 6.3–6.5.

The heated diffusion juice 26 is then passed via conduit 34 into a preliming chamber 36 normally constructed of steel or other relatively inert composition. The preliming chamber 36 may involve many different structural forms, and the system 10 shall not be limited to any particular designs in connection with the preliming chamber 36. However, in a preferred embodiment, the preliming chamber 36 will consist of an elongate tank 40 having a plurality of individual compartments 42 therein which are separated by baffle members 44. The baffle members 44 are d designed to permit fluid communication/fluid flow between the compartments 42. Positioned within each compartment 42 as schematically illustrated in FIG. 1 is a movable paddle-type agitating member 46. This type of preliming chamber 36 and the benefits associated therewith are disclosed in U.S. Pat. No. 2,774,693 to Brieghel-Müller which is incorporated herein by reference.

The diffusion juice 26 enters the preliming chamber 36 at the first end 48 thereof via conduit 34. Simultaneously with the introduction of diffusion juice 26 into the first end 48 of the preliming chamber 36, a preliminary supply of lime 50 is directed into the chamber 36 at the opposite or second end 52 via a conduit 54. As noted above, the terms "lime", "lime materials", "milk of lime", and "lime compositions" as used herein shall be considered equivalent to each other, with such terms involving calcium oxides or hydroxides in solid (powder) or liquid (suspension) form. In a preferred embodiment, milk of lime will be used which essentially involves a water-based lime slurry consisting of $Ca(OH)_2$ that is well known in the art and suitable for use as a preliming agent. Milk of lime is produced in accordance with the following reaction:

$$CaO + H_2O \leftarrow \rightarrow Ca(OH)_2 + 15.5 \text{ Cal.} \tag{2}$$

To achieve optimal results, milk of lime materials suitable for use as the preliminary supply of lime 50 will contain about 150–170 g of CaO per liter of water to achieve a milk of lime product which is about 30–35 brix density.

The preliminary supply of lime 50 is added to the diffusion juice 26 in an amount sufficient to increase the pH of the juice 26 from the initial pH level listed above to a level above about 11.6 (e.g. optimally between about 11.5–11.8).

To accomplish this goal, the preliminary supply of lime 50 (e.g. milk of lime as previously described at a brix density level of about 30–35) is added to the diffusion juice 26 in a milk of lime:diffusion juice weight ratio of about 1:70 to 1:90. However, the foregoing numerical values are provided for example purposes only, and may vary as determined by preliminary pilot studies on the particular type of diffusion juice 26 being treated.

In addition, during the preliming process, a preliminary supply of calcium carbonate 60 (e.g. $CaCO_3$) is added to the preliming chamber 36 (e.g. tank 40) via conduit 61. Addition of the preliminary supply of calcium carbonate 60 preferably occurs at or near the midpoint 62 of the tank 40 illustrated in FIG. 1. While the preliminary supply of calcium carbonate 60 may involve the use of fresh, unused materials, it is preferred that the supply of calcium carbonate 60 actually consist of recycled calcium carbonate sludge materials received from subsequent portions of the system 10. In a preferred embodiment (using either fresh or recycled materials), the preliminary supply of calcium carbonate 60 will preferably involve a water-based sludge or slurry which optimally contains about 150–170 g of calcium carbonate per liter of water. This water-based composition used as the preliminary supply of calcium carbonate 60 is preferably added to the diffusion juice 26 in a calcium carbonate composition:diffusion juice weight ratio of about 1:35 to 1:45. This aspect of the system 10, as well as the function of the preliminary supply of calcium carbonate 60, will be described in further detail below.

Addition of the preliminary supply of lime 50 to the diffusion juice 26 in a gradual and progressive manner within the preliming chamber 36 (e.g. as described in U.S. Pat. No. 2,774,693) produces a prelimed juice product 70 which passes out of the preliming chamber 36 via conduit 72. Preliming as described above causes the dissolved and colloidal non-sugar impurities within the initial diffusion juice 26 to flocculate and produce a plurality of floc particles 74 within the prelimed juice product 70. Flocculated non-sugar impurities will typically involve a variety of undesired contaminants as noted above, including but not limited to inorganic acids, organic acids, phosphate compositions, metal ions (e.g. iron, aluminum, and/or magnesium ions), proteins, pectins, coloring agents, and saponins. Of primary concern is the flocculation of protein materials. When the pH of the diffusion juice 26 increases during preliming, the iso-electric points of dissolved proteins within the juice 26 are reached, thereby causing flocculation. The term "iso-electric point" is defined above.

It should also be noted that use of the preliminary supply of calcium carbonate 60 in the preliming process (e.g. within the preliming chamber 36) provides numerous benefits. The preliminary supply of calcium carbonate 60 forms cores or substrates which are surrounded (encapsulated) by flocculated protein materials. This process increases the weight and density of the floc particles 74, thereby facilitating the filtration/settling of such materials and subsequent removal from the system 10 as discussed below. Finally, the supply of calcium carbonate 60 functions as a filter aid within the system 10 during the separation of solid and liquid components. In summary, the main goals which are accomplished by preliming include the flocculation of protein materials and other dissolved/colloidal non-sugar materials, pH stabilization of the juice materials, substantial decolorization of the juice materials, and improved filterability of liquid products. Of particular importance is the precipitation of undesired contaminants as discussed above.

The prelimed juice product 70 (in combination with the floc particles 74) is thereafter transferred via in-line pump 76

(e.g. of a conventional volumetric or centrifugal type) and conduit 80 into a second heating unit 82. In a preferred embodiment, the second heating unit 82 is of the same general type as the first heating unit 32 described above. However, the system 10 shall not be limited exclusively to any particular heating apparatus in connection with the second heating unit 82. To achieve optimum results, it is preferred that the prelimed juice product 70 be heated within the second heating unit 82 to a temperature of about 75°–85° C. Heating at this temperature is designed to activate various chemical reactions which degrade soluble non-sugar materials as discussed below. It should also be noted that the pH of the prelimed juice product 70 at this point within the system 10 is about 11.3–11.5. The heated, prelimed juice product 70 is then directed via conduit 84 into a main liming chamber 86 (FIG. 1).

Once the heated, prelimed juice product 70 is within the main liming chamber 86, it is combined with a main supply of lime 90 via conduit 92 (FIG. 1). The main supply of lime 90 is traditionally obtained from an energy-intensive calcination process which takes place inside a lime kiln (not shown). To produce the main supply of lime 90 within the kiln, limestone (e.g. calcium carbonate) is heated to a temperature of about 980°–1200° C. for a time period of about 30–120 minutes. Calcination of the lime within the kiln takes place in accordance with the following basic reaction:

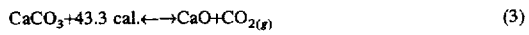

$$CaCO_3 + 43.3 \text{ cal.} \leftarrow\!\!\rightarrow CaO + CO_{2(g)} \qquad (3)$$

Specific technical aspects and details regarding the thermal calcination of calcium carbonate materials to produce lime (CaO) are discussed in McGinnis, R. A. (3rd ed.), *Beet-Sugar Technology*, Beet Sugar Development Foundation, Fort Collins, Colo. (USA), Ch. XVII, pp. 567–593 (1982) which is incorporated herein by reference. The foregoing process also generates a gaseous reaction product which consists of about 25–35% by weight gaseous carbon dioxide, with the balance of the reaction product consisting primarily of gaseous nitrogen. This gaseous reaction product can be used in subsequent portions of the system 10 as discussed below. Large amounts of energy, equipment, and labor are needed for the calcination process as indicated above. Likewise, a substantial supply of lime is required at this stage. In accordance with conventional technology, about 90% of the lime used within the system 10 is consumed during the main liming process inside the main liming chamber 86.

After lime production as described above, the main supply of lime 90 is added to the prelimed juice product 70 in an amount sufficient to increase the pH of the prelimed juice product 70 from the level listed above (e.g. about 11.3–11.5) to a level above about 12.6 (optimally between about 12.5–12.7). The main supply of lime 90 may consist of dry (powdered) lime or, in a preferred embodiment, milk of lime. If milk of lime is used as the main supply of lime 90, it is preferably manufactured by using about 150–170 g of CaO per liter of water to produce a milk of lime product having a brix density level of about 30–35. In a preferred embodiment involving the use of milk of lime having the characteristics set forth above, the main supply of lime 90 is added to the prelimed juice product 70 in a milk of lime-:prelimed juice product weight ratio of about 1:10 to 1:14. However, the foregoing numerical values are provided for example purposes only, and may vary as determined by preliminary pilot studies on the particular beet juice compositions being treated.

Within the main liming chamber 86, the prelimed juice product 70 is combined with the main supply of lime 90 at relatively high temperatures (e.g. about 75°–85° C.) in order to increase the pH of the prelimed juice product 70 as described above. The basic goal of main liming within the main liming chamber 86 is to provide a sufficient level of alkalinity to further precipitate and decompose other impurities within the prelimed juice product 70. At this stage, these impurities will include proteins, pectins, invert sugar, and insoluble calcium compounds (such as calcium phosphate and calcium sulfate). The high temperature conditions (e.g. about 75°–85° C.) which are present within the chamber 86 are necessary in order to accelerate the desired chemical reactions inside the chamber 86 and ensure that the reactions proceed substantially to completion. Residence time of the main supply of lime 90 and the prelimed juice product 70 within the main liming chamber 86 is preferably about 25–40 minutes. However, the specific time period associated with main liming will vary in view of many factors as determined by preliminary routine experimentation.

As a result of the main liming process, a limed juice product 100 is generated which is subjected to additional treatment. However, because of the strong alkaline conditions within the main liming chamber 86 and the high temperature levels which are maintained over a significant time period, additional impurities are generated which remain within the limed juice product 100. These impurities (which result as by-products from the main liming process) include soluble degradation products such as lactic acid and acetic acid. In addition, the highly-alkaline conditions within the main liming chamber 86 will decompose part of the sugar (sucrose) that was initially present in the prelimed juice product 70. In this regard, about 0.1–0.5% by weight of the sugar originally within the prelimed juice product 70 will be decomposed when main liming is employed. Main liming is therefore characterized by a number of disadvantages including (1) the increased consumption of raw materials (e.g. lime); (2) the need for additional processing steps and hardware; (3) increased energy requirements; (4) the creation of additional impurities in the limed juice product 100; (5) increased residence time requirements which decrease the overall efficiency of the system 10; and (6) the destruction of significant amounts of sugar. Because the present invention eliminates main liming as a process step, all of these disadvantages are avoided as discussed below.

With continued reference to FIG. 1, the limed juice product 100 is routed via conduit 102 into a primary carbonation chamber 104. Within the primary carbonation chamber 104, the limed juice product 100 is combined with a primary supply of gaseous carbon dioxide 106 which is provided to the chamber 104 via conduit 110. This step is designed to precipitate excess amounts of lime within the limed juice product 100. The primary supply of gaseous carbon dioxide 106 may involve fresh, commercially-available supplies of carbon dioxide or (in a preferred embodiment), a carbon dioxide-containing gaseous reaction product generated as a by-product during lime production within the lime kiln as indicated above. To achieve optimum results, about 1.2–1.5 tons of the primary supply of gaseous carbon dioxide 106 will be used per ton of the limed juice product 100. However, the reaction process shall not be limited to the foregoing numerical parameters or materials which are provided for example purposes. Precise amounts of carbon dioxide 106 to be combined with the limed juice product 100, as well as the particular sources of the carbon dioxide 106 to be employed within the system 10 will vary in view of numerous factors as determined by preliminary pilot tests. Furthermore, residence time of the limed juice product 100 within the primary carbonation chamber 104 will be about 15–20 minutes in a preferred embodiment.

Combination of the limed juice product 100 with the primary supply of carbon dioxide 106 produces a mixture 112 which consists of a calcium carbonate sludge product 114 within a first juice fraction 116. At this stage, the mixture 112 (e.g. the sludge product 114 in combination with the first juice fraction 116) will have a pH of about 11.0–12.0. These materials are thereafter routed via conduit 120 to a clarifier 122 in the form of a gravity settling tank 124 of conventional design. Within the settling tank 124, the sludge product 114 gravitationally separates from the first juice fraction 116 so that the juice fraction 116 is positioned within the upper portion 126 of the tank 124, with the sludge product 114 residing in the lower portion 130 of the tank 124.

Thereafter, the sludge product 114 is removed from the tank 124 via conduit 132. The first juice fraction 116 is likewise directed out of the tank 124 via conduit 134. The first juice fraction 116 is then transferred via in-line pump 136 (e.g. of a conventional volumetric or centrifugal type) within conduit 140 into a third heating unit 142. In preferred embodiment, the third heating unit 142 is in-line within the conduit 140 as illustrated, and is of the same general type as the first heating unit 32 described above. To achieve optimum results, it is preferred that the first juice fraction 116 be heated within the third heating unit 142 to a temperature of about 90°–95° C. Heating at this temperature is designed to reduce the solubility of the lime that remains in solution within the first juice fraction 116. The heated first juice fraction 116 is thereafter routed via conduit 150 into a secondary carbonation chamber 152. Within the secondary carbonation chamber 152, the juice fraction 116 is combined with a secondary supply of gaseous carbon dioxide 154 which is transferred into the chamber 152 via conduit 156. This step is designed to precipitate the remaining lime from the juice fraction 116. The secondary supply of gaseous carbon dioxide 154 may involve fresh, commercially-available supplies of carbon dioxide or (in a preferred embodiment), a carbon dioxide-containing gaseous reaction product generated as a by-product during lime production within the lime kiln as described above. To achieve optimum results, about 1.2–1.5 tons of the secondary supply of gaseous carbon dioxide 154 will be used per ton of the first juice fraction 116. Precise amounts of carbon dioxide 154 to be combined with the juice fraction 116, as well as the particular sources of the carbon dioxide 154 employed within the system 10 at this stage will vary in view of numerous factors as determined by preliminary pilot tests. Furthermore, residence time of the juice fraction 116 within the secondary carbonation chamber 152 will again be about 15–20 minutes in a preferred embodiment.

Combination of the first juice fraction 116 with the secondary supply of carbon dioxide 154 produces a mixture 160 which consists of a solid waste composition 162 within a second juice fraction 164 which is of greater purity than the first juice fraction 116. The solid waste composition 162 will consist of residual, unreacted lime which remains in the system 10 (e.g. from the main liming step), as well as precipitates formed by interactions between the secondary supply of carbon dioxide 154 and the first juice fraction 116. At this stage, the mixture 160 (e.g. the solid waste composition 162 in combination with the second juice fraction 164) will have a pH of about 8.8–9.4. The mixture 160 is then routed via conduit 166 into a mechanical filter unit 170 (e.g. a drum or pressure leaf-type filtration system) which separates the solid waste composition 162 from the second juice fraction 164. Passing outwardly from the mechanical filter unit 170 via conduit 172 is the second juice fraction 164 (minus the solid waste composition 162) in the form of a purified beet juice product 174 which is substantially clear and of a highly pure character. The solid waste composition 162 is removed from the mechanical filter unit 170 via conduit 176. At this stage, the purified beet juice product 174 will typically contain about 85–87% by weight water, about 12–13% by weight sugar (sucrose), and about 1–2% by weight residual amounts of various dissolved/colloidal non-sugar impurities therein (compared with about 2–3% by weight dissolved/colloidal non-sugar impurities in the diffusion juice 26 as described above). The purified beet juice product 174 may thereafter be subjected to additional processing steps of a conventional nature as are necessary to manufacture a final crystalline sugar product. These additional steps may include one or more further carbonation stages (if needed as determined by pilot testing) and treatment with sulfur dioxide gas (e.g. $SO_{2(g)}$) to remove any residual color-forming agents. These additional steps (if used) are then followed by conventional evaporation and crystallization of the purified juice product which generates +99% pure crystalline sugar (sucrose).

As described above and illustrated in FIG. 1, the conventional processing system 10 is capable of manufacturing a purified juice product of high purity which can thereafter be converted into crystalline sucrose. The system 10 may actually involve additional steps including various recycling and reprocessing stages which have been omitted for the sake of clarity. Nonetheless, the system 10 as shown in FIG. 1 includes substantially all of the major processing stages which are used to manufacture the purified beet juice product 174 as described above in accordance with conventional processing technology. However, system 10 uses substantial amounts of energy and raw materials, especially lime and carbon dioxide. In particular, the main liming and primary carbonation stages of the system 10 as shown within dashed box 180 in FIG. 1 are energy-intensive and consume a majority of the raw materials needed to manufacture the purified beet juice product 174. This is especially true regarding the large amount of lime (e.g. milk of lime) which is used inside the main liming chamber 86. As previously indicated, approximately 90% of the lime consumption within the system 10 takes place in the main liming chamber 86. Significant amounts of equipment, plant-space, and energy are required to produce this lime in accordance with the calcination process described above.

The present invention involves significant improvements to the system 10 shown in FIG. 1. It is characterized by elimination of the components and process steps within the dashed box 180 of FIG. 1. In particular, the claimed process allows a purified beet juice product to be manufactured without the use of a main liming stage. The present invention likewise eliminates one of the two carbonation stages used in system 10. As a result, a greatly simplified processing method is provided which substantially reduces the amounts of raw materials and energy which are needed to manufacture a purified beet juice product. In addition, the claimed method uses less equipment with reduced labor and maintenance requirements. For these reasons and the other reasons described below, the claimed system represents a significant advance in sugar production technology.

B. The Method of the Present Invention

Figure 2:
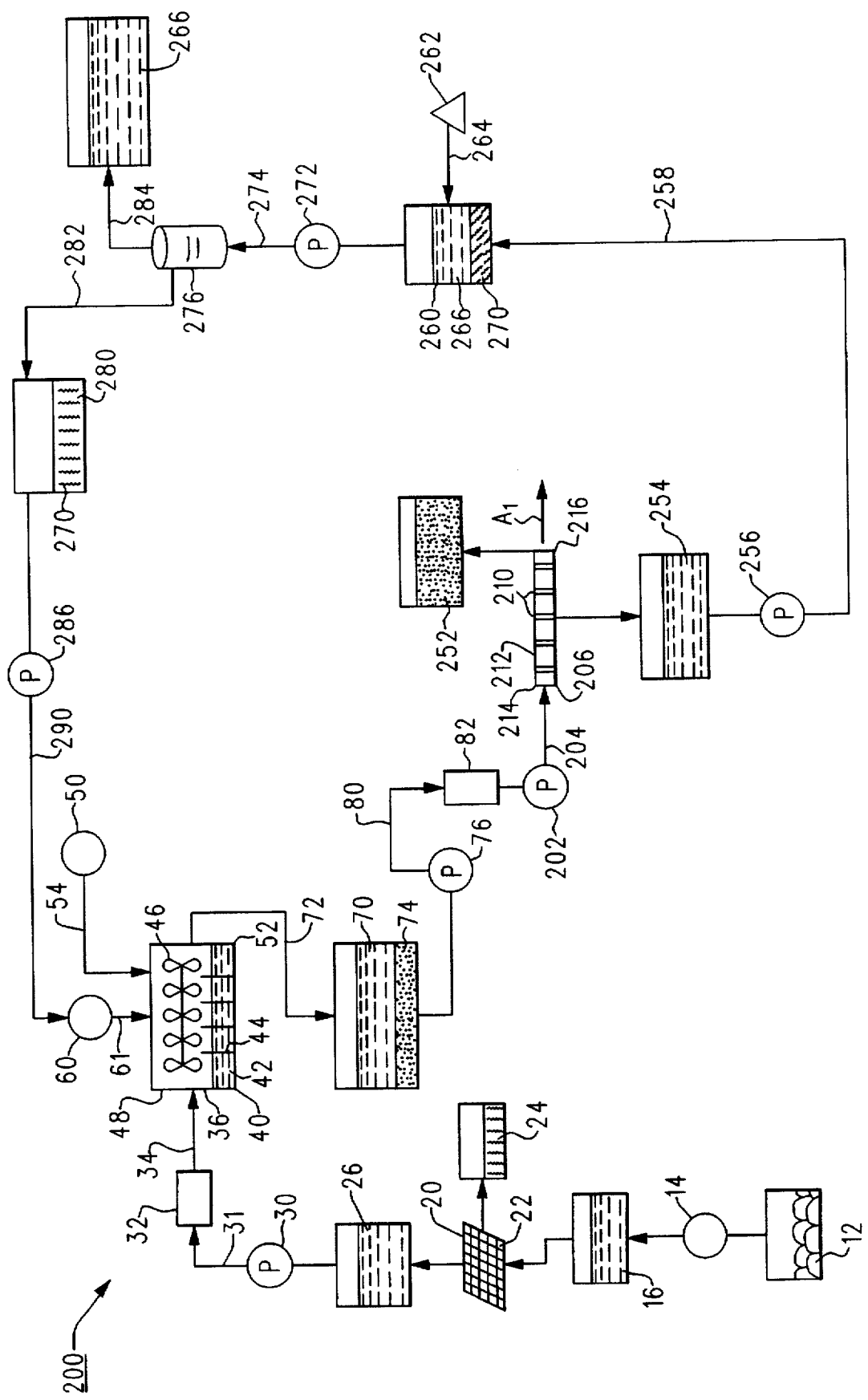
FIG. 2 is a schematic illustration of the process steps, procedures, and components which are used to prepare a purified beet juice product from sugar beets in accordance with a preferred embodiment of the present invention.

With reference to FIG. 2, a modified system 200 produced in accordance with the present invention is schematically illustrated. Components, materials, and structures which are common to both system 200 and system 10 will have the same reference numbers in all of the drawing Figures. For example, systems 10 and 200 both use the same steps and components to produce the prelimed juice product 70. Accordingly, the information and parameters provided above regarding manufacture of the prelimed juice product 70 in system 10 will be applicable to system 200. System 200 differs in a significant manner from system 10 in the treatment of prelimed juice product 70 to produce a purified beet juice composition which can ultimately be evaporated and crystallized as discussed below.

Prior to processing within the system 200, the prelimed juice product 70 will be about 1–2% by weight solid material (e.g. floc particles 74) which must be removed. The floc particles 74 will typically involve a variety of undesired contaminants as noted above, including but not limited to inorganic acids, organic acids, phosphate compositions, metal ions (e.g. iron, aluminum, and/or magnesium ions), proteins, pectins, coloring agents, finely divided residual lime in undissolved form, and saponins. Likewise, the prelimed juice product 70 will also include a variable amount of dissolved/colloidal (non-flocculated) impurities which need to be eliminated. These materials include but are not limited to fine beet particles, proteins, pectins, sulfates, and phosphates. Impurity levels in the prelimed juice product 70 will vary in view of many factors including the grade of beets being processed, and reaction conditions employed within the system 200.

With continued reference to FIG. 2, treatment of the prelimed juice product 70 will now be discussed. As noted above, all of the elements, components, and subsystems within the dashed box 180 in system 10 (FIG. 1) are eliminated in system 200. The specific components which are not used in system 200 include the main liming chamber 86, the main supply of lime 90, conduit 102, the primary carbonation chamber 104, the primary supply of gaseous carbon dioxide 106, conduit 120, the gravity settling tank 124, conduit 134, pump 136, conduit 140, and the third heating unit 142. The elimination of these components significantly reduces raw material (e.g. lime) consumption and energy use. To manufacture a purified beet juice product using system 200 which has a purity level comparable to that of the purified beet juice product 174 in system 10, a unique and simplified procedure is employed. This procedure is schematically shown in FIG. 2.

As illustrated in FIG. 2, the prelimed juice product 70 (and floc particles 74 therein) is transferred via in-line pump 76 and conduit 80 into the second heating unit 82 as described above in connection with system 10. Within the second heating unit 82, the prelimed juice product 70 is heated to a temperature of about 50°–95° C. As discussed below, a key aspect of system 200 involves the use of one or more specialized membrane filtration units. While the system 200 may operate without heating the prelimed juice product 70 if desired, heating is employed to increase the membrane flux rate within the system 200 so that higher product output levels may be achieved. The term "membrane flux" as used herein is defined as the flow rate of permeate through the selected membrane as a function of the membrane area in, for example, gallon per ft$^2$ per day (hereinafter "GFD"). The specific temperature to be used within the range listed above will depend on a variety of factors as determined by preliminary pilot testing including the size of the system 200, the type of membrane filtration apparatus being used, and the desired output of the system 200. Accordingly, the present invention shall not be limited to any particular temperature level at this stage of the claimed process. In contrast, prior system 10 requires a temperature level of 75°–85° C. within the second heating unit 82. This temperature level is required to ensure that the chemical reactions associated with main liming proceed to completion. Since main liming is eliminated in the present invention, high temperature levels are no longer an absolute requirement. Instead, heating can be eliminated entirely or undertaken at lower levels (e.g. at the lower end of the 50°–95° C. range listed above). As a result, less energy will be consumed in the system 200 and thermal deterioration of sugar molecules will be substantially reduced and/or avoided. In the system 10 of FIG. 1, some of the sugar molecules within the main liming chamber 86 are thermally degraded because of the high temperature levels within the main liming chamber 86 which are maintained for a considerable amount of time (e.g. 25–40 minutes). Since these requirements do not exist in system 200 (especially long residence times), the above problems are avoided.

Next, the heated prelimed juice product 70 is transferred via in-line pump 202 (e.g. of a conventional volumetric or centrifugal type) and conduit 204 to at least one porous filtration membrane 206 which is schematically illustrated in FIG. 2. In a preferred embodiment, the prelimed juice product 70 is delivered to the filtration membrane 206 at a typical flow rate of about 1000–10000 GPM (gallons per minute) using the pump 202. This flow rate will provide efficient results in a typical sugar production facility. As stated above, the flow rate at which the prelimed juice product 70 is delivered to the filtration membrane 206 will vary in view of many factors which relate to the desired output levels and overall size of the processing system 200. In this regard, the present invention shall not be limited to any particular rate at which the prelimed juice product 70 is delivered to the selected membrane system. Optimum filtration results will be achieved if the pH of the prelimed juice product 70 is between about 10.5–13.0. As previously noted, the pH of the prelimed juice product 70 at this stage is normally about 11.3–11.5 which is well within the foregoing range. However, if necessary, desired increases in alkalinity (pH) at this point in the process can be achieved by the selective introduction of additional amounts of the preliminary supply of lime 50 to the diffusion juice 26 in the preliming chamber 36. The precise amount of additional lime 50 to be added and the monitoring of pH levels associated with the prelimed juice product 70 may be achieved and implemented through the use of conventional on-line pH monitoring systems.

As shown in an enlarged format in FIG. 2 for the sake of clarity, the filtration membrane 206 will include a plurality of pores 210 therethrough, with each of the pores 210 having a diameter sufficient to prevent the passage of solid floc particles 74 and dissolved/colloidal impurities (listed above) through the filtration membrane 206 while allowing dissolved sugar molecules to pass therethrough. In a preferred embodiment, all of the pores 210 in the membrane 206 will be substantially equivalent in size, with each pore 210 having a diameter not exceeding about 0.5 microns. However, highly efficient results will be obtained when the diameter of each pore 210 is about 0.002–0.5 microns, with optimum results being achieved using a pore diameter of about 0.01–0.2 microns. While even smaller pores 210 may be used, this diameter range is preferred since it allows filtration to occur at a sufficiently high membrane flux rate (defined above) to ensure efficient operation of the system 200. Thus, to ensure that the output of the system 200 is maintained at acceptable levels, the above-listed diameter range is preferred. As discussed below, it is desired that the system 200 be capable of processing at least about 600–1000 gallons of prelimed juice product 70 per minute or more.

Filtration membranes are entirely different from conventional mechanical filtration systems (e.g. drum-type filters, pressure leaf devices, and the like) in structure, function, and capability. As discussed further below, filtration membranes typically involve a multi-porous membrane structure associated with a support apparatus. Many filtration membranes exist which are manufactured from a variety of materials ranging from polymeric plastic compositions to thin-layer ceramic products. In the system 200, the filtration membranes which are most suitable for use involve two specific categories, namely, (1) microfiltration membranes; and (2) ultrafiltration membranes. Each of the membranes in these categories will have multiple pores therethrough of substantially equivalent size. The pore size for a given membrane will vary, depending on which category is involved. Microfiltration membranes typically involve pore diameters ranging from about 0.1–10 microns. They are generally capable of blocking the passage of small solid particles and nearly all species of bacteria. Ultrafiltration membranes typically involve pore diameters ranging from about 10 angstroms— 0.1 microns, and will block the passage of large organic molecules, as well as bacteria, viruses, and other microorganisms. The specific membrane to be selected for a given application will depend on the desired pore size. For example, the removal of particles from a solution having a diameter of 0.6 microns or more would involve the use of a 0.5 micron microfiltration membrane. In the present case, each of the pores 210 in the filtration membrane 206 will be substantially equal in size with a diameter not exceeding about 0.5 microns. As previously stated, highly efficient results will be achieved using a pore diameter of about 0.002–0.5 microns, with optimum results being attained when a pore diameter of about 0.01–0.2 microns is employed. Either a microfiltration membrane or ultrafiltration membrane may be used as the membrane 206, with the selection of either membrane type depending on many factors including the desired output of the system 200.

Ultrafiltration and microfiltration membranes which are suitable for use in the system 200 as the filtration membrane 206 are commercially available from many sources, including but not limited to Tech-Sep (a subsidiary of Rhone-Poulenc Group) of Cranbury, N.J. (USA) which distributes ultrafiltration membranes and microfiltration membranes under the names IRIS®, PLEIADE®, and CARBOSEP® [product numbers 6501, 6502, 6504, 6508, 6515, 3028, 3065, 3038, 3042, 3050 and others]. Ultrafiltration and microfiltration membranes are also commercially available from Koch Membrane Systems, Inc. of Wilmington, Mass. (USA)—[product numbers 7838-HFM-180-FSHN and S8-HFK-618-VSV] and Osmo Membrane Systems of Minnetonka, Minn. (USA). As previously noted, ultrafiltration and microfiltration membranes may be produced from a variety of different materials including polymeric plastic compositions. In addition, ultrafiltration and microfiltration membranes made from ceramic compositions may likewise be employed in the system 200. Ceramic filtration membranes are commercially available from many sources, including CeraMem Separations of Waltham, Mass. (USA) —[product numbers 1300, 0500, 0200, 0050, and 0010]. In this regard, the present invention shall not be limited to any particular type of filtration membrane.

The claimed invention shall also not be limited to any particular method for delivering the prelimed juice product 70 to the selected filtration membrane 206. For example, the prelimed juice product 70 may be delivered in a downward direction onto the upper surface 212 of the filtration membrane 206 (e.g. in a direction perpendicular to the longitudinal axis $A_1$ of the membrane 206 shown in FIG. 2). However, in a preferred embodiment, delivery of the prelimed juice product 70 to the membrane 206 will take place in a different manner. With reference to FIG. 2, the filtration membrane 206 includes a first end 214 and a second end 216. In the embodiment of FIG. 2, the prelimed juice product 70 is delivered to the first end 214 of the filtration membrane 206 so that it flows onto the filtration membrane 206 and travels straight across the upper surface 212 of the membrane 206 from the first end 214 to the second end 216. As a result, the prelimed juice product 70 will flow across the membrane 206 in a direction which is parallel to the longitudinal axis $A_1$ of the membrane 206. This type of procedure in which the prelimed juice product 70 flows continuously across the upper surface 212 of the filtration membrane 206 from the first end 214 to the second end 216 is known as "crossflow filtration". Crossflow filtration of the prelimed juice product 70 prevents cloggage of the pores 210 with solid materials (e.g. floc particles 74). This is accomplished by the continuous "sweeping" action of the prelimed juice product 70 as it moves across the membrane 206. While the present invention shall not be limited to any particular rate at which the prelimed juice product 70 flows across the upper surface 212 of the membrane 206, it is preferred that the flow rate be equivalent to the rate at which the prelimed juice product 70 enters the first end 214 of the membrane 206 (e.g. about 1000–10000 GPM as noted above). Maintenance of this flow rate is accomplished by the pump 202 as described above.

Figure 3:
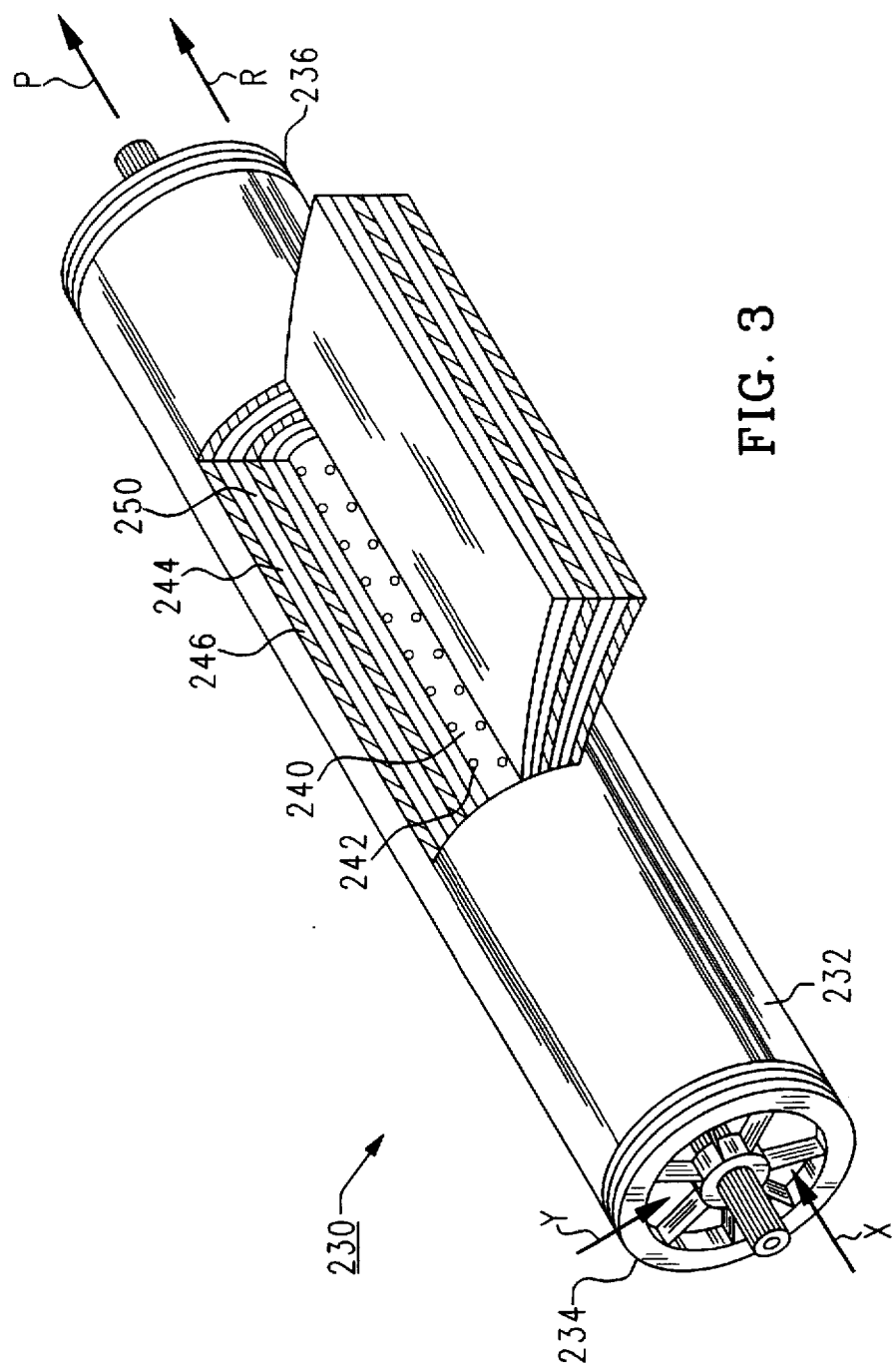
FIG. 3 is a schematic illustration of an exemplary cartridge-type filter unit which is suitable for use in the present invention.

While a planar (flat) filtration membrane 206 is illustrated in FIG. 2, this representation is schematic in nature with many different membrane types being suitable for use in the system 200. To effectively accomplish crossflow filtration as discussed above, optimal results will be achieved if a cylindrical membrane cartridge unit is employed. A representative membrane cartridge unit is schematically illustrated in FIG. 3 at reference number 230. Each cartridge unit 230 is typically about 40–60 inches long and about 4–8 inches in diameter. As shown in FIG. 3, cartridge unit 230 includes a housing 232 having a first end 234 and a second end 236. The first end 234 and the second end 236 are both open so that fluids may pass entirely through the housing 232. In the center of the cartridge unit 230, an elongate conduit 240 is provided which includes a plurality of openings 242 therethrough. Surrounding the conduit 240 are multiple, spirally-wound layers 244 of membrane-type filter material which, in most cases, involves a selected organic composition of proprietary design. Also associated with the layers 244 of filter material are layers 246 of a porous spacer material (e.g. a proprietary plastic/polymer mesh) and layers 250 of a membrane backing composition (e.g. preferably manufactured from a non-porus plastic product). However, the specific layers of material, the type of layers which are used, and the arrangement of the layers will vary from one commercial product to another. In this regard, the present invention shall not be limited to a cartridge unit 230 having any particular internal design, with the schematically illustrated arrangement of layers in FIG. 3 being provided for example purposes. Many commercial products may have additional layers or different layer arrangements.

To use the cartridge unit 230 in the system 200, the prelimed juice product 70 enters the first end 234 of the cartridge unit 230 in the direction of arrow "X". The prelimed juice product 70 is not allowed to enter the elongate conduit 240 which is designed to receive filtered permeate (described below). As a result, the incoming fluid passes between and through the layers 244 of filter material. Liquid passing through each layer 244 of filter material (e.g. the "permeate" as discussed below) comes in contact with an adjacent layer 250 of backing material. Each layer 250 of backing material is of a type which prevents the permeate from passing therethrough. Instead, the layers of backing material cause the permeate to flow in a spiral, inward manner toward the center of the cartridge unit 230 where it comes in contact with the conduit 240. The permeate ultimately enters the conduit 240 through the openings 242. It should be noted that the permeate flows inwardly toward the conduit 240 in the direction of arrow "Y" which is perpendicular to the direction in which the prelimed juice product 70 enters the cartridge unit 230. As indicated above, the juice product 70 enters the cartridge unit 230 in the direction of arrow "X" which also constitutes the longitudinal axis of the cartridge unit 230. entering the conduit 240, the permeate flows through the conduit 240 and leaves the cartridge unit 230 at the second end 236 in the direction of arrow "P". In contrast, the materials which did not pass through the layers 244 of filter material (e.g. the "retentate" as discussed below) continue to flow across the layers 244 and leave the cartridge unit 230 at the second end 236 in the direction of arrow "R". Both the retentate and the permeate may then be collected and further treated/processed as desired.

As noted above, the present invention shall not be limited to any particular design associated with the filtration membrane 206 (and cartridge unit 230). Representative cartridge-type ultrafiltration and microfiltration units which may be used in the system 200 are commercially available from many sources including Koch Membrane Systems of Wilmington, Mass. (USA)—[product numbers 7838-HFM-180-FSHN and S8-HFK-618-VSV] and Osmo Membrane Systems of Minnetonka, Minn. (USA). While a single filtration membrane 206 is shown schematically in FIG. 2, multiple membranes 206 (e.g. multiple cartridge units 230) may be used either in series or parallel with each other. The selection of a particular arrangement or number of filtration membranes 206 will depend on numerous factors including the specific nature of the prelimed juice product 70 being treated, the size of the system 200, and its desired output. In this regard, the present invention shall not be restricted to any number or arrangement of filtration membranes 206. However, in a representative example, if 240,000 gallons of a prelimed juice product 70 are to be treated at a desired flow (feed) rate of about 1000 GPM, effective filtration will occur if 30 cylindrical ultrafiltration cartridge units made by Koch Membrane Systems of Wilmington, Mass. (USA)—[product number 7838-HFM-180-FSHN] are used in parallel. These units have a pore size of 0.05 microns. However, this example is representative only, with other filtration systems and arrangements being suitable for use in the present invention.

Regardless of which type of filtration membrane 206 is used, filtration of the prelimed juice product 70 will generate a retentate 252 which does not pass through the membrane 206 and leaves the membrane 206 at the second end 216 in the crossflow embodiment of FIG. 2. Likewise, filtration of the prelimed juice product 70 will generate a permeate 254 which passes through the membrane 206. Representative flow and flux rates which are appropriate for use in a typical sugar production facility are described above. However, the flow rate at which the prelimed juice product 70 is delivered to the filtration membrane 206 will vary in view of many factors which depend on the desired output levels and overall size of the processing system 200. In this regard, the present invention shall not be limited to any particular rate at which the prelimed juice product 70 is delivered to the selected membrane system and any specific membrane flux rates. For example, in an exemplary embodiment involving a flow (feed) rate of about 1000–10000 GPM (gallons per minute), an optimum permeate flux rate will be about 50–250 GFD as discussed above.

After filtration of the prelimed juice product 70, nearly all of the solid floc particles 74 previously in the juice product 70 will be present in the retentate 252 and absent from the permeate 254. In this regard, the permeate 254 will have a nearly negligible solids content of less than about 1 ppm (part per million) which is comparable to the solids content of the purified beet juice product 174 manufactured using the prior system 10. Because these results are achieved without the components and equipment illustrated in the dashed box 180 in system 10 (FIG. 1), the claimed invention represents a substantial and significant development in the sugar processing industry. Filtration of the prelimed juice product 70 will also remove bacteria and residual dissolved/colloidal contaminants as described above so that these materials are substantially absent from the permeate 254. Regarding the retentate 252 (which contains the materials removed from the prelimed juice product 70), it may be discarded or further treated in accordance with an alternative embodiment of the invention discussed below.

With continued reference to FIG. 2, the permeate 254 is then further processed. Specifically, the permeate 254 may include residual amounts of dissolved (solvated) lime therein from the original preliming stages of the system 200. A typical permeate 254 will include about 50–100 ppm dissolved lime therein, although this value will vary depending on reaction conditions and other parameters. The dissolved lime must be removed so that a final sugar product of maximum purity can be manufactured.

At this stage, the pH of the permeate 254 will be about 11.0–12.0. To remove the dissolved lime from the permeate 254, a reduction in pH must take place. As shown in FIG. 2, this step is accomplished by transferring the permeate 254 via in-line pump 256 (e.g. of a conventional volumetric or centrifugal type) and conduit 258 into a carbonation chamber 260. The carbonation chamber 260 is equivalent in structure and function to the secondary carbonation chamber 152 in the prior system 10 as described above. Within the carbonation chamber 260, the permeate 254 is combined with a supply of gaseous carbon dioxide 262 which is introduced into the chamber 260 through conduit 264 at a preferred flow rate of about 100–1000 CFM (cubic feet per minute), with the precise flow rate depending on many factors including the type and size of the processing system 200 being employed. This step is designed to reduce the pH of the permeate 254 to a level at which the dissolved lime within the permeate 254 precipitates out as a solid composition (e.g. a calcium carbonate precipitate) which may be readily removed by conventional physical processes (discussed below). As a result, the dissolved lime will be eliminated from the permeate 254. The supply of gaseous carbon dioxide 262 may involve fresh, commercially-available supplies of carbon dioxide or a carbon dioxide-containing gaseous reaction product generated as a by-product during production of the preliminary supply of lime 50. To achieve optimum results, the gaseous carbon dioxide 262 will be used in an amount sufficient to cause elimination of the residual amounts of dissolved lime from the permeate 254 by conversion of the dissolved lime into a calcium carbonate precipitate as described above. In a preferred embodiment, this result will be achieved by using an amount of gaseous carbon dioxide 262 sufficient to cause the permeate 254 to have a decreased pH level of about 8.8–9.4. Normally, this pH level will be determined using conventional pH testing equipment, with the flow of gaseous carbon dioxide 262 into the carbonation chamber 260 being automatically adjusted to maintain the desired permeate pH level within the foregoing range. To achieve a permeate pH level of 8.8–9.4 in an exemplary and representative embodiment of the invention, about 1–3 lbs. of gaseous, substantially pure carbon dioxide 262 will be used per ton of permeate 254. The amount of carbon dioxide 262 to be used at this stage is small since most of the dissolved lime originally within the juice materials in the system 200 was removed by the prior steps listed above. However, the present invention shall not be limited to the foregoing numerical parameters involving carbon dioxide use which are provided for example purposes. Precise amounts of carbon dioxide 262 to be combined with the permeate 254 in the carbonation chamber 260, as well as the particular sources of the carbon dioxide 262 employed within the system 200 will vary in view of numerous factors as determined by preliminary pilot tests. Furthermore, residence time of the permeate 254 within the carbonation chamber 260 will be about 15–20 minutes in a preferred embodiment.

Adjustment of the permeate pH to the level listed above creates a chemical environment in which residual amounts of dissolved lime within the permeate 254 are converted into the calcium carbonate precipitate. From a chemical standpoint, conversion occurs because the dissolved lime becomes essentially insoluble within the above pH range. The elimination of dissolved lime from the permeate 254 produces a purified beet juice product 266 within the carbonation chamber 260. The term "purified beet juice product" is used since, in most cases, about 60–80% the dissolved lime originally within the permeate 254 will be absent from the product 266. As indicated above, the dissolved lime is eliminated by conversion into a calcium carbonate precipitate which is present (e.g. suspended) in the purified beet juice product 266. As schematically shown in FIG. 2, the calcium carbonate precipitate is represented at reference number 270.

At this stage, the purified beet juice product 266 will only contain about 0.015–0.025% by weight dissolved residual lime therein. The purified beet juice product 266 (with the calcium carbonate precipitate 270 suspended therein) may then be directly sent to subsequent sugar processing stages (e.g. $SO_{2(g)}$ clarification, etc.), with removal of the precipitate 270 taking place at a later time. Alternatively, as illustrated in FIG. 2, the purified beet juice product 266 with the precipitate 270 therein can be transferred via in-line pump 272 (e.g. of a conventional volumetric or centrifugal type) and conduit 274 into a conventional mechanical filtration apparatus 276. In a preferred embodiment designed to provide a maximum degree of efficiency and cost-effectiveness, the filtration apparatus 276 will consist of either a standard drum-type filter unit or a conventional pressure leaf filter apparatus, both of which are known in the art for liquid treatment. As a result, the calcium carbonate precipitate 270 will be removed from the purified beet juice product 266. The removed precipitate 270 (typically in the form of a calcium carbonate-containing sludge 280) is routed out of the filtration apparatus 276 via conduit 282, with the purified beet juice product 266 (minus the precipitate 270) being transferred out of the filtration apparatus 276 using conduit 284. The purified beet juice product 266 can then be further treated as described above (e.g. using $SO_{2(g)}$ clarification and evaporation) to generate a final crystalline sugar product of +99% purity. The calcium carbonate-containing sludge 280 derived from the precipitate 270 can either be discarded or, in a preferred embodiment illustrated in FIG. 2, transferred via in-line pump 286 (e.g. of a conventional volumetric or centrifugal type) and conduit 290 into the initial preliming chamber 36 for use as the preliminary supply of calcium carbonate 60. Recycling of the sludge 280 in this manner substantially increases the efficiency of the system 200 by reducing material costs and avoiding waste disposal problems.

As described above, the system 200 provides a substantial number of benefits and represents a new and unique application of membrane filtration technology. By using membrane filtration at a specific point in the process (e.g. after preliming), followed by a single carbonation of the membrane permeate, a highly efficient method is provided for producing a purified beet juice product. The claimed method represents a substantial departure from prior systems by using the following reaction sequence: (A) preliming of the diffusion juice to generate a prelimed juice product; (B) membrane filtration of the prelimed juice product to produce a filtered permeate; and (C) single-stage carbonation of the permeate to manufacture a purified beet juice product. As a result, the claimed method eliminates a considerable amount of equipment (e.g. the items contained within dashed box 180 in FIG. 1), uses considerably less raw materials (e.g. lime), avoids the generation of substantial amounts of waste products, and decreases the level of energy required in the process compared with prior methods. In addition, membrane filtration of the prelimed juice product is clearly distinguishable from membrane filtration at any other stages (e.g. filtration of the "raw juice product" before preliming). As stated above, the claimed 3-step process which occurs at a specific point in the system 200 and involves a particular order of sequential steps is a clear departure from prior methods.

Figure 4:
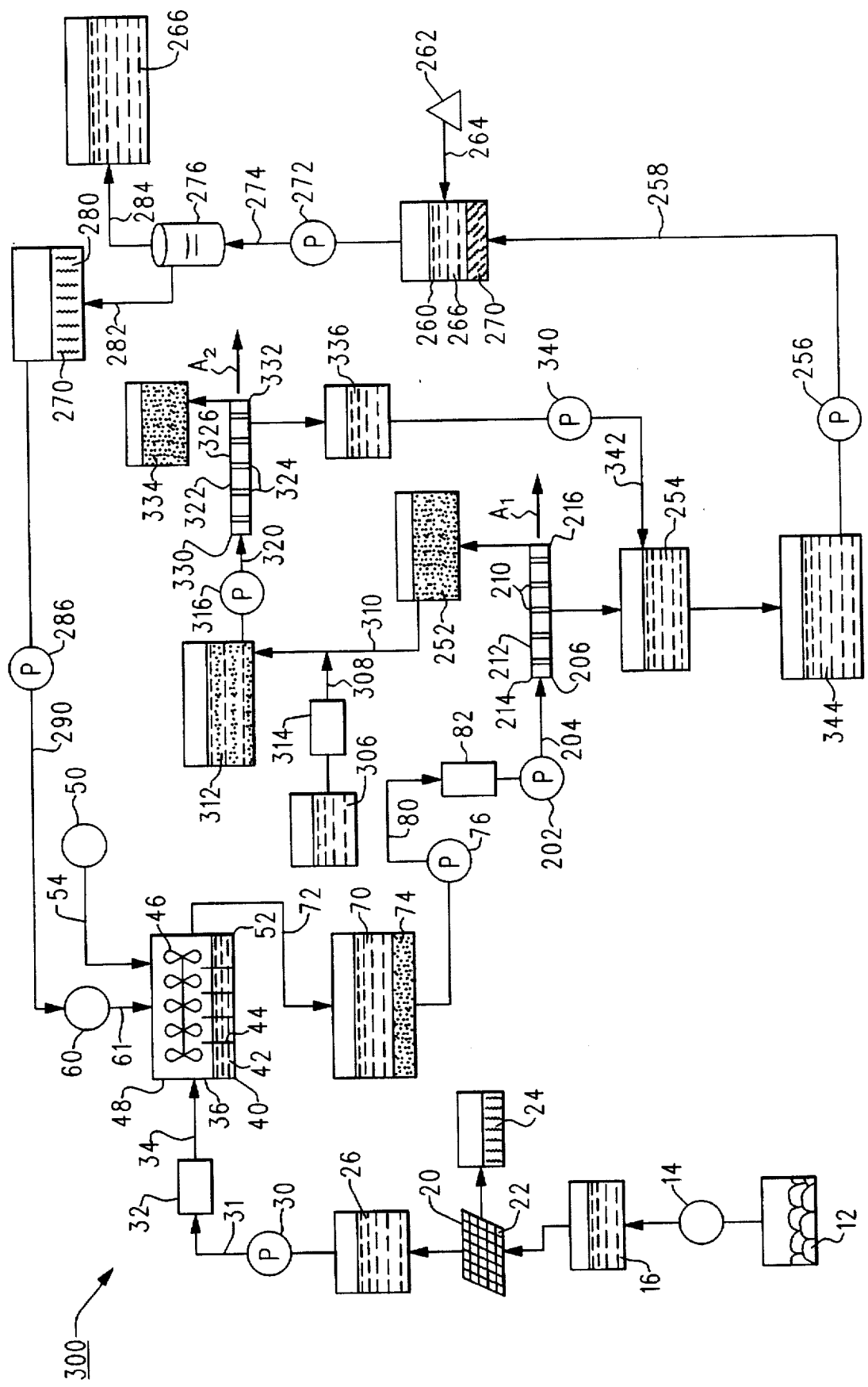
FIG. 4 is a schematic illustration of the process steps, procedures, and components which are used to prepare a purified beet juice product from sugar beets in accordance with an alternative embodiment of the system shown in FIG. 2.

An alternative system 300 is shown in FIG. 4. All of the components, reaction parameters, flow rates, flux rates, temperatures and sub-systems used in the embodiment of FIG. 4 are the same as those associated with the system 200 of FIG. 2 except as indicated below. With reference to FIG. 4, an additional step is provided in system 300 which removes and recovers residual amounts of dissolved sugar molecules from the retentate 252. In most cases, the retentate 252 will include variable amounts of residual dissolved sugar molecules which, for many reasons, did not pass through the filtration membrane 206. Typically, the retentate 252 will contain about 5–10% by weight dissolved sugar therein, although this value will vary in view of many factors including the initial sugar content of the beets 12 being processed, the production parameters used within the system 300 and other factors. To recover the residual sugar from the retentate 252 and improve the overall efficiency of the sugar manufacturing process, system 300 involves an additional step in which the retentate 252 is combined with a supply of water 306 via conduits 308, 310 to produce an aqueous retentate product 312 schematically illustrated in FIG. 4. While the present invention shall not be limited to any particular amount of water 306 in producing the aqueous retentate product 312, an exemplary and preferred embodiment will involve the use of about 100–200 gallons of water 306 per ton of retentate 252. This amount may again be varied in view of many factors including the quantity of retentate 252 being treated and other system parameters. The water 306 will preferably have a temperature of about 50°–70° C. which may be maintained through the use of an optional auxiliary heating unit 314 which is in-line within the conduit 308 and is of the same general type as the first heating unit 32 described above. At this stage, the aqueous retentate product 312 will typically contain about 15–30% by weight solid material (e.g. floc particles 74) and will have a pH of about 11.0–12.0 prior to further treatment.

The aqueous retentate product 312 is then transferred via in-line pump 316 (e.g. of a conventional volumetric or centrifugal type) and conduit 320 to a secondary porous filtration membrane 322 at a preferred flow rate of about 100–1000 GPM, although the specific flow rate for a given situation will depend on the size of the sugar processing plant and other factors as determined by preliminary pilot experimentation. In the embodiment of FIG. 4, the filtration membrane 206 will be characterized as a "primary" filtration membrane, with the filtration membrane 322 being designated as a "secondary" filtration membrane.

The secondary filtration membrane 322 is optimally of the same type and configuration as the primary filtration membrane 206, with all of the information listed above regarding the primary filtration membrane 206 being applicable to the secondary filtration membrane 322. As shown in an enlarged format in FIG. 4 for the sake of clarity, the secondary filtration membrane 322 will include a plurality of pores 324 therethrough, with each of the pores 324 having a diameter sufficient to prevent the solid floc particles 74 associated with the aqueous retentate product 312 from passing through the membrane 322 while allowing dissolved sugar molecules to pass therethrough. The pores 324 will likewise be small enough to prevent bacteria and dissolved/colloidal contaminants within the aqueous retentate product 312 from passing through the membrane 322. In a preferred embodiment, each pore 324 in the secondary filtration membrane 322 will be substantially the same size as each pore 210 in the primary filtration membrane 206. Specifically, all of the pores 324 in the membrane 322 will be of substantially equal size, with each pore 324 having a diameter not exceeding about 0.5 microns. Highly efficient results will be achieved using a pore diameter of about 0.002–0.5 microns, with optimum results being achieved when a pore diameter of about 0.01–0.2 microns is used. While even smaller diameter pores 324 may be used, the above-listed diameter values are preferred since they allow filtration to occur at a sufficiently high membrane flux rate to ensure efficient operation of the system 300.

Representative filtration systems which are most suitable for use as the secondary filtration membrane 322 involve two specific categories, namely, (1) microfiltration membranes; and (2) ultrafiltration membranes. Both of these membrane types are discussed above, along with exemplary commercial sources from which these membranes may be obtained. Again, all of the information described above regarding the primary filtration membrane 206 (including commercial membrane suppliers) is applicable to the secondary filtration membrane 322. In addition, the system 300 shall not be limited to any particular method for delivering the aqueous retentate product 312 onto the secondary filtration membrane 322. For example, the aqueous retentate product 312 may be delivered in a downward direction onto the upper surface 326 of the secondary filtration membrane 322 (e.g. in a direction perpendicular to the longitudinal axis $A_2$ of the membrane 322 shown in FIG. 4). However, in a preferred embodiment, delivery of the aqueous retentate product 312 will take place in a crossflow manner as discussed above. With reference to FIG. 4, the secondary filtration membrane 322 includes a first end 330 and a second end 332. In the preferred embodiment of FIG. 4, the aqueous retentate product 312 is delivered to the first end 330 of the secondary filtration membrane 322 so that the retentate product 312 flows onto the membrane 322 and travels straight across the upper surface 326 from the first end 330 to the second end 332. As shown in FIG. 1, the direction in which the aqueous retentate product 312 flows is parallel to the longitudinal axis $A_2$ of the membrane 322. This type of crossflow system effectively prevents cloggage of the pores 324 in the membrane 322 with solid materials (e.g. floc particles 74). This is accomplished by the continuous "sweeping" action of the aqueous retentate product 312 as it moves across the membrane 322. While the present invention shall not be limited to any particular rate at which the aqueous retentate product 312 flows across the upper surface 326 of the secondary filtration membrane 322, it is preferred that the flow rate be equivalent to the rate at which the retentate product 312 enters the first end 330 of the membrane 322 (e.g. about 100–1000 GPM in an exemplary embodiment as noted above). Maintenance of this flow rate is accomplished by the pump 316 as described above.

While a planar (flat) secondary filtration membrane 322 is illustrated in FIG. 4, this representation is schematic in nature with many different membrane types being suitable for use in the system 300. To effectively accomplish crossflow filtration of the aqueous retentate product 312, optimal results will be achieved if a cylindrical membrane cartridge unit is used. A representative cartridge unit suitable for use as the secondary filtration membrane 322 is shown in FIG. 3 at reference number 230 and described above. Commercial sources for cylindrical membrane cartridge units that may be used as the secondary filtration membrane 322 are also listed above. Accordingly, all of the previously-described information involving the cartridge unit 230 as it applies to the embodiment of FIG. 2 is equally applicable to the embodiment of FIG. 4. While a single secondary filtration membrane 322 is shown schematically in FIG. 4, multiple membranes 322 (e.g. multiple cartridge units 230) may be used either in series or parallel with each other. The selection of a particular arrangement or number of secondary filtration membranes 322 will depend on a variety of factors including the content of the aqueous retentate product 312 being treated, the size of the system 300, and its desired output. In this regard, the present invention shall not be limited to any number or arrangement of secondary filtration membranes 322. However, in a representative example, if 120,000 gallons of an aqueous retentate product 312 are to be treated at a desired flow (feed) rate of about 1000 GPM, effective filtration will occur if 30 cylindrical ultrafiltration cartridge units made by Koch Membrane Systems of Wilmington, Mass. (USA)—[product number 7838-HFM-180-FSHN] are used in parallel. These units have a pore size of 0.05 microns. However, this example is representative only, with other filtration systems and arrangements being suitable for use in this embodiment of the present invention.

After delivery of the aqueous retentate product 312 to the secondary filtration membrane 322, a solid waste product 334 is generated which does not pass through the membrane 322 and leaves the membrane 322 at the second end 332 in the crossflow embodiment of FIG. 4. The material passing through the secondary filtration membrane 322 consists of a filtrate 336 which includes the residual dissolved sugar molecules therein which were originally present in the retentate 252. Likewise, the filtrate 336 is characterized by the absence of solid floc particles 74, dissolved/colloidal impurities, and bacteria which remain within the solid waste product 334. The flux rate associated with the filtrate 336 will vary in view of many factors, including the size and desired capacity of the system 300. For example, in an exemplary embodiment involving a flow (feed) rate of about 100–1000 GPM (gallons per minute), an optimum filtrate flux rate will be about 50–100 GFD. The filtrate 336 is then transferred via in-line pump 340 (e.g. of a conventional volumetric or centrifugal type) and conduit 342 to the permeate 254 obtained from the primary filtration membrane 206. As a result, the filtrate 336 is combined with the permeate 254 to form a juice mixture 344 schematically illustrated in FIG. 4. The juice mixture 344 is thereafter routed via in-line pump 256 and conduit 258 into the carbonation chamber 260. The juice mixture 344 is thereafter treated (e.g. carbonated) in the same manner indicated above regarding the permeate 254 in the embodiment of FIG. 2 to obtain the purified beet juice product 266. Specifically, all of the parameters and components described above regarding carbonation and subsequent treatment of the permeate 254 in the embodiment of FIG. 2 are equally applicable to the juice mixture 344 in the embodiment of FIG. 4. Use of system 300 illustrated in FIG. 4 can, depending on the materials being processed, increase the final yield of crystalline sugar by as much as about 2.5%. A decision to employ the embodiment of FIG. 4 will be based on many factors including the specific beet materials being treated and the desired configuration of the processing system as determined by preliminary testing.

As described above, the present invention involves a unique and simplified method for obtaining purified beet juice materials which are used to manufacture crystalline sugar. The invention provides numerous benefits compared with conventional sugar processing methods. As noted above, these benefits include: (1) a substantial reduction in the amount of lime (e.g. milk of lime) which is needed in the process; (2) a considerable decrease in the amount of carbon dioxide which is used; (3) simplification of the processing system by the elimination of various components and subsystems associated with main liming; (4) a significant reduction in system energy consumption (especially in the production of lime since main liming is eliminated as a process step); (5) reduced environmental impact and the decreased production of lime-based waste materials; (6) a decreased number of processing steps; (7) substantially diminished labor and plant-space requirements; and (8) a considerable increase in the economic efficiency of the entire sugar production system in accordance with items (1)–(7) listed above.

Having herein described preferred embodiments of the present invention, it is anticipated that suitable modifications can be made thereto by individuals skilled in the art which will nonetheless remain within the scope of the invention. For example, the specific structural components used in connection with the claimed system may be varied as necessary in accordance with many factors including the desired size and complexity of the sugar processing plant. Accordingly, the present invention shall not be limited to any specific production equipment and shall only be construed in connection with the following claims:

The invention that is claimed is:

1. A method for treating and purifying beet juice to produce a purified beet juice product comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a prelimed juice product comprising a plurality of solid floc particles therein, said floc particles being formed from said non-sugar impurities in said beet juice when said preliminary supply of lime and said preliminary supply of calcium carbonate are combined with said beet juice;

providing at least one porous filtration membrane comprising a plurality of pores therethrough, each of said pores having a diameter sufficient to prevent passage of said solid floc particles through said filtration membrane while allowing passage of dissolved sugar molecules therethrough;

delivering said prelimed juice product to said filtration membrane so that said prelimed juice product flows onto said filtration membrane in order to produce a retentate which does not pass through said filtration membrane and a permeate which passes through said filtration membrane, said solid floc particles being present in said retentate and absent from said permeate; and combining said permeate with a supply of carbon dioxide gas in order to eliminate any residual amounts of dissolved lime from said permeate and produce a purified beet juice product therefrom.

2. The method of claim 1 wherein said prelimed juice product is delivered to said filtration membrane at a flow rate of about 1000–10000 GPM.

3. The method of claim 1 wherein said permeate passes through said filtration membrane at a membrane flux rate of about 50–250 GFD.

4. The method of claim 1 further comprising the step of heating said prelimed juice product to a temperature of about 50°–95° C. prior to said delivering of said prelimed juice product to said filtration membrane.

5. The method of claim 1 wherein said combining of said permeate with said carbon dioxide gas comprises the step of combining said permeate with an amount of said carbon dioxide gas sufficient to cause said permeate to have a pH level of about 8.8–9.4, said pH level causing elimination of said residual amounts of dissolved lime from said permeate by conversion of said dissolved lime into a calcium carbonate precipitate, said elimination of said dissolved lime from said permeate producing said purified beet juice product therefrom, said purified beet juice product having said precipitate suspended therein.

6. The method of claim 5 further comprising the step of removing said calcium carbonate precipitate from said purified beet juice product.

7. The method of claim 1 wherein each of said pores through said filtration membrane has a diameter of about 0.002–0.5 microns.

8. A method for treating and purifying beet juice to produce a purified beet juice product comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a prelimed juice product comprising a plurality of solid floc particles therein, said floc particles being formed from said non-sugar impurities in said beet juice when said preliminary supply of lime and said preliminary supply of calcium carbonate are combined with said beet juice;

providing at least one porous filtration membrane comprising a plurality of pores therethrough, each of said pores having a diameter sufficient to prevent passage of said solid floc particles through said filtration membrane while allowing passage of dissolved sugar molecules therethrough, said filtration membrane further comprising a first end and a second end thereof;

delivering said prelimed juice product to said first end of said filtration membrane so that said prelimed juice product flows onto said filtration membrane and travels across said filtration membrane from said first end to said second end in order to produce a permeate which passes through said filtration membrane during movement of said prelimed juice product across said filtration membrane, said delivering of said prelimed juice product to said first end of said filtration membrane further producing a retentate which does not pass through said filtration membrane, said retentate leaving said filtration membrane at said second end thereof, said solid floc particles being present in said retentate and absent from said permeate, said movement of said prelimed juice product across said filtration membrane from said first end to said second end preventing cloggage of said pores in said filtration membrane; and combining said permeate with a supply of carbon dioxide gas in order to eliminate any residual amounts of dissolved lime from said permeate and produce a purified beet juice product therefrom.

9. The method of claim 8 further comprising the step of heating said prelimed juice product to a temperature of about 50°–95° C. prior to said delivering of said prelimed juice product to said first end of said filtration membrane.

10. The method of claim 8 wherein each of said pores through said filtration membrane has a diameter of about 0.002–0.5 microns.

11. The method of claim 8 wherein said prelimed juice product is delivered to said first end of said filtration membrane at a flow rate of about 1000–10000 GPM.

12. A method for treating and purifying beet juice to produce a purified beet juice product comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a prelimed juice product comprising a plurality of solid floc particles therein, said floc particles being formed from said non-sugar impurities in said beet juice when said preliminary supply of lime and said preliminary supply of calcium carbonate are combined with said beet juice;

providing at least one porous primary filtration membrane comprising a plurality of pores therethrough, each of said pores having a diameter sufficient to prevent passage of said solid floc particles through said primary filtration membrane while allowing passage of dissolved sugar molecules therethrough;

delivering said prelimed juice product to said primary filtration membrane so that said prelimed juice product flows onto said primary filtration membrane in order to produce a retentate which does not pass through said primary filtration membrane and a permeate which passes therethrough, said solid floc particles being present in said retentate and absent from said permeate;

combining said retentate with a supply of water to produce an aqueous retentate product, said aqueous retentate product comprising said solid floc particles in combination with residual amounts of dissolved sugar molecules which did not pass through said primary filtration membrane;

providing at least one porous secondary filtration membrane comprising a plurality of pores therethrough, each of said pores through said secondary filtration membrane having a diameter sufficient to prevent passage of said solid floc particles through said secondary filtration membrane while allowing passage of said residual amounts of dissolved sugar molecules therethrough;

delivering said aqueous retentate product to said secondary filtration membrane so that said aqueous retentate product flows onto said secondary filtration membrane to produce a solid waste product which does not pass through said secondary filtration membrane and a filtrate which passes therethrough, said filtrate comprising said residual amounts of dissolved sugar molecules therein;

combining said filtrate with said permeate to form a juice mixture; and combining said juice mixture with a supply of carbon dioxide gas in order to eliminate any residual amounts of dissolved lime from said juice mixture and produce a purified beet juice product therefrom.

13. The method of claim 12 further comprising the step of heating said prelimed juice product to a temperature of about 50°–95° C. prior to said delivering of said prelimed juice product to said primary filtration membrane.

14. The method of claim 12 wherein each of said pores through said primary filtration membrane has a diameter of about 0.002–0.5 microns.

15. The method of claim 12 wherein each of said pores through said secondary filtration membrane has a diameter of about 0.002–0.5 microns.

16. A method for treating and purifying beet juice to produce a purified beet juice product comprising the steps of:

providing a supply of beet juice comprising water, sugar, and dissolved non-sugar impurities therein;

combining said beet juice with a preliminary supply of lime and a preliminary supply of calcium carbonate in a preliming chamber in order to produce a prelimed juice product comprising a plurality of solid floc particles therein, said floc particles being formed from said non-sugar impurities in said beet juice when said preliminary supply of lime and said preliminary supply of calcium carbonate are combined with said beet juice;

heating said prelimed juice product to a temperature of about 50°–95° C.;

providing at least one porous primary filtration membrane comprising a plurality of pores therethrough, each of said pores having a diameter of about 0.002–0.5 microns which is sufficient to prevent passage of said solid floc particles through said primary filtration membrane while allowing passage of dissolved sugar molecules therethrough, said primary filtration membrane further comprising a first end and a second end;

delivering said prelimed juice product to said first end of said primary filtration membrane at a flow rate of about 1000–10000 GPM after said heating of said prelimed juice product so that said prelimed juice product flows onto said primary filtration membrane and travels across said primary filtration membrane from said first end to said second end thereof, said delivering of said prelimed juice product to said first end of said primary filtration membrane producing a permeate which passes through said primary filtration membrane at a membrane flux rate of about 50–250 GFD during movement of said prelimed juice product across said primary filtration membrane, said delivering of said prelimed juice product to said first end of said primary filtration membrane further producing a retentate which does not pass through said primary filtration membrane, said retentate leaving said primary filtration membrane at said second end thereof, said solid floc particles being present in said retentate and absent from said permeate, said movement of said prelimed juice product across said primary filtration membrane from said first end to said second end preventing cloggage of said pores in said primary filtration membrane;

combining said retentate with a supply of water to produce an aqueous retentate product, said aqueous retentate product comprising said solid floc particles in combination with residual amounts of dissolved sugar molecules which did not pass through said primary filtration membrane;

providing at least one porous secondary filtration membrane comprising a plurality of pores therethrough, each of said pores through said secondary filtration membrane having a diameter of about 0.002–0.5 microns which is sufficient to prevent passage of said solid floc particles through said secondary filtration membrane while allowing passage of said residual amounts of dissolved sugar molecules therethrough;

delivering said aqueous retentate product to said secondary filtration membrane so that said aqueous retentate product flows onto said secondary filtration membrane to produce a solid waste product which does not pass through said secondary filtration membrane and a filtrate which passes through said secondary filtration membrane, said filtrate comprising said residual amounts of dissolved sugar molecules therein;

combining said filtrate with said permeate to form a juice mixture;

combining said juice mixture with a supply of carbon dioxide gas in order to eliminate any residual amounts of dissolved lime from said juice mixture and produce a purified beet juice product therefrom, said carbon dioxide gas being used in an amount sufficient to cause said juice mixture to have a pH level of about 8.8–9.4, said pH level causing elimination of said residual amounts of dissolved lime from said juice mixture by conversion of said dissolved lime into a calcium carbonate precipitate, said elimination of said dissolved lime from said juice mixture producing said purified beet juice product therefrom, said purified beet juice product having said precipitate suspended therein;

removing said calcium carbonate precipitate from said purified beet juice product; and transferring said calcium carbonate precipitate into said preliming chamber for use as said preliminary supply of calcium carbonate.

\* \* \* \* \*